US012288931B2

(12) United States Patent
Seo et al.

(10) Patent No.: US 12,288,931 B2
(45) Date of Patent: Apr. 29, 2025

(54) ELECTRONIC DEVICE COMPRISING ANTENNA

(71) Applicant: Samsung Electronics Co., Ltd., Suwon-si (KR)

(72) Inventors: Mincheol Seo, Suwon-si (KR); Hosaeng Kim, Suwon-si (KR); Donghun Shin, Suwon-si (KR); Yoonjae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/303,145

(22) Filed: Apr. 19, 2023

(65) Prior Publication Data

US 2023/0307825 A1 Sep. 28, 2023

Related U.S. Application Data

(63) Continuation of application No. 17/459,375, filed on Aug. 27, 2021, now Pat. No. 11,664,587, which is a
(Continued)

(30) Foreign Application Priority Data

Feb. 13, 2019 (KR) ........................ 10-2019-0016597

(51) Int. Cl.
*H01Q 1/24* (2006.01)
*H01Q 1/12* (2006.01)
(Continued)

(52) U.S. Cl.
CPC ............ *H01Q 1/38* (2013.01); *H01Q 1/1221* (2013.01); *H01Q 1/243* (2013.01); *H01Q 1/42* (2013.01);
(Continued)

(58) Field of Classification Search
CPC ........ H01Q 1/1221; H01Q 1/24; H01Q 1/243; H01Q 1/42; H01Q 1/22; H01Q 5/371;
(Continued)

(56) References Cited

U.S. PATENT DOCUMENTS

| | | | |
|---|---|---|---|
| 6,067,054 | A | 5/2000 | Johannisson et al. |
| 7,088,290 | B2 | 8/2006 | Ohno et al. |

(Continued)

FOREIGN PATENT DOCUMENTS

| | | | |
|---|---|---|---|
| CN | 1260912 | A | 7/2000 |
| CN | 101188326 | A | 5/2008 |

(Continued)

OTHER PUBLICATIONS

International Search Report dated Jun. 11, 2020, issued in International Application No. PCT/KR2020/002027.
(Continued)

*Primary Examiner* — Hoang V Nguyen
(74) *Attorney, Agent, or Firm* — Jefferson IP Law, LLP

(57) ABSTRACT

An electronic device is provided. The electronic device includes a support member, a front plate disposed on a front surface of the support member, a back plate disposed on a back surface of the support member, a non-conductive structure interposed between the back plate and an edge of the support member and fixed to the support member, and an antenna structure interposed between the back plate and an edge of the support member. At least a portion of the antenna structure may be disposed to face the non-conductive structure. In a region of the non-conductive structure, which faces the antenna structure, a separated distance from the antenna structure varies depending on a distance from a bottom surface of the support member to which the non-conductive structure is fixed.

17 Claims, 19 Drawing Sheets

Related U.S. Application Data continuation of application No. 16/790,059, filed on Feb. 13, 2020, now Pat. No. 11,133,581.

(51) Int. Cl.

| | |
|---|---|
| ***H01Q 1/38*** | (2006.01) |
| ***H01Q 1/42*** | (2006.01) |
| ***H01Q 5/371*** | (2015.01) |
| ***H01Q 9/04*** | (2006.01) |
| ***H01Q 21/06*** | (2006.01) |

(52) U.S. Cl.

CPC .......... *H01Q 5/371* (2015.01); *H01Q 9/0407* (2013.01); *H01Q 21/061* (2013.01)

(58) Field of Classification Search

CPC ........ H01Q 5/50; H01Q 9/0407; H01Q 15/08; H01Q 19/06; H01Q 21/00; H01Q 21/061

See application file for complete search history.

(56) References Cited

U.S. PATENT DOCUMENTS

| | | | | |
|---|---|---|---|---|
| 7,161,555 | B2 | 1/2007 | Ohno et al. | |
| 7,592,969 | B2 | 9/2009 | Proctor, Jr. et al. | |
| 7,791,541 | B2 | 9/2010 | Chang et al. | |
| 7,893,889 | B2 | 2/2011 | Proctor, Jr. et al. | |
| 8,054,227 | B2 | 11/2011 | Chang et al. | |
| 8,111,194 | B2 | 2/2012 | Chang et al. | |
| 8,253,629 | B2 | 8/2012 | Huang et al. | |
| 8,638,263 | B2 | 1/2014 | Hansen et al. | |
| 8,692,718 | B2 | 4/2014 | Kato et al. | |
| 8,888,008 | B2 | 11/2014 | Teshima | |
| 8,917,211 | B2 | 12/2014 | Kato et al. | |
| 10,062,954 | B2 | 8/2018 | Hong et al. | |
| 10,297,900 | B2 | 5/2019 | Lee et al. | |
| 10,340,592 | B2 | 7/2019 | Nam et al. | |
| 10,396,434 | B2 | 8/2019 | Koo et al. | |
| 10,516,204 | B2 | 12/2019 | Cho et al. | |
| 10,601,111 | B2 | 3/2020 | Ko et al. | |
| 10,700,415 | B2 | 6/2020 | Shin et al. | |
| 10,714,810 | B2 | 7/2020 | Hong et al. | |
| 11,223,104 | B2 | 1/2022 | Lee et al. | |
| 2004/0119646 | A1 | 6/2004 | Ohno et al. | |
| 2005/0057402 | A1 | 3/2005 | Ohno et al. | |
| 2009/0231221 | A1 | 9/2009 | Huang et al. | |
| 2012/0249388 | A1 | 10/2012 | Hansen et al. | |
| 2013/0134225 | A1 | 5/2013 | Teshima | |
| 2016/0118713 | A1* | 4/2016 | Hong .................. | H01Q 9/0407 343/702 |
| 2017/0033434 | A1 | 2/2017 | Hong et al. | |
| 2017/0201014 | A1 | 7/2017 | Lee et al. | |
| 2017/0207516 | A1 | 7/2017 | Koo et al. | |
| 2017/0250460 | A1 | 8/2017 | Shin et al. | |
| 2018/0034148 | A1 | 2/2018 | Nam et al. | |
| 2018/0090817 | A1 | 3/2018 | Rajagopalan et al. | |
| 2018/0191059 | A1 | 7/2018 | Ko et al. | |
| 2018/0241115 | A1 | 8/2018 | Cho et al. | |
| 2018/0358686 | A1 | 12/2018 | Park | |
| 2019/0273308 | A1 | 9/2019 | Lee et al. | |

FOREIGN PATENT DOCUMENTS

| | | | |
|---|---|---|---|
| CN | 10-1553956 | A | 10/2009 |
| CN | 102187518 | A | 9/2011 |
| CN | 108432041 | A | 8/2018 |
| JP | 2000-278030 | A | 10/2000 |
| KR | 10-2015-0116417 | A | 10/2015 |
| KR | 10-2016-0047234 | A | 5/2016 |
| KR | 10-2017-0082799 | A | 7/2017 |
| KR | 10-2018-0013615 | A | 2/2018 |

OTHER PUBLICATIONS

Extended European Search Report dated Jun. 26, 2020, issued in European Application No. 20157121.3-1205.

Extended European Search Report dated Nov. 25, 2022, issued in European Patent Application No. 22190707.4-1205.

Korean Office Action dated Jan. 17, 2023, issued in Korean Patent Application No. 10-2019-0016597.

Chinese Office Action dated May 6, 2024, issued in Chinese Application No. 202010090902.4.

Notice of Allowance dated May 7, 2024, issued in Korean Application No. 10-2023-0096375.

Notice of Allowance Oct. 16, 2024, issued in Chinese Application No. 202010090902.4.

* cited by examiner

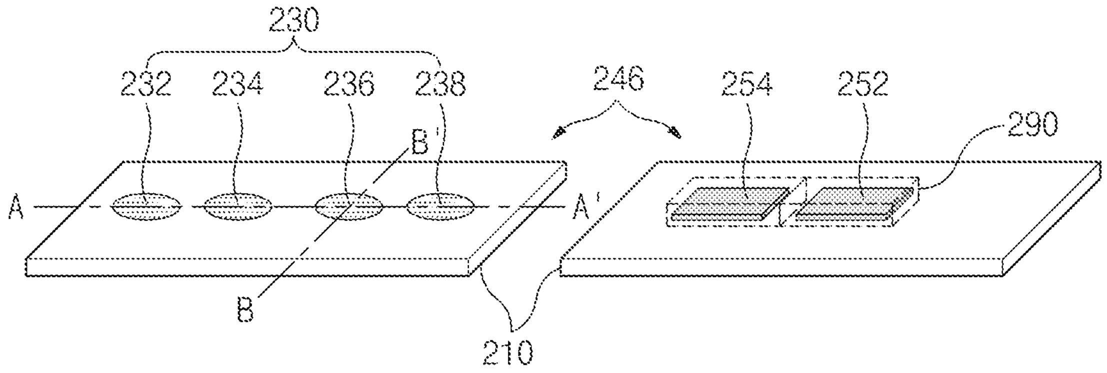
FIG.2A
FIG.2B
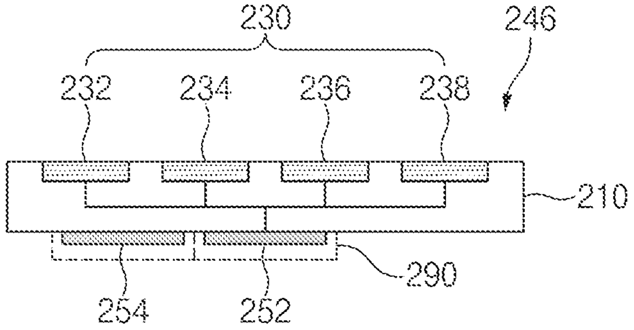
FIG.2C

| Realized Gain | V-pole | | |
|---|---|---|---|
| | @-120 | @-90 | @-60 |
| Module | 9.2 | 10.4 | 8.9 |
| Def. | 3.9 | 5.5 | 2.8 |
| Ver1. | 9.6 | 8.7 | 5.0 |
| Ver2. | 6.8 | 7.1 | 4.1 |
| Ver3. | 6.3 | 7.0 | 4.1 |

| Realized Gain | V-pole | | | H-pole | | |
|---|---|---|---|---|---|---|
| | @-120 | @-90 | @-60 | @-120 | @-90 | @-60 |
| Module | 9.2 | 10.4 | 8.9 | 8.8 | 10.1 | 9.0 |
| Def. | 3.8 | 7.2 | 8.4 | 8.4 | 5.5 | -0.5 |
| Asymmetry_cut | 8.6 | 9.0 | 9.0 | 9.0 | 6.8 | 2.2 |
| Step_cut | 7.4 | 6.1 | 8.4 | 8.4 | 10.4 | 3.6 |

ELECTRONIC DEVICE COMPRISING ANTENNA

CROSS-REFERENCE TO RELATED APPLICATION(S)

This application is a continuation application of prior application Ser. No. 17/459,375, filed on Aug. 27, 2021, which is a continuation application of prior application Ser. No. 16/790,059, filed on Feb. 13, 2020, which has issued as U.S. Pat. No. 11,133,581 on Sep. 28, 2021, which was based on and claimed priority under 35 U.S.C § 119 (a) of a Korean patent application number 10-2019-0016597, filed on Feb. 13, 2019, in the Korean Intellectual Property Office, the disclosure of which is incorporated by reference herein in its entirety.

BACKGROUND

1. Field

The disclosure relates to a structure of an electronic device including an antenna.

2. Description of Related Art

With the sharp increase of mobile traffic, a next-generation communication technology (e.g., 5th generation (5G) or wireless gigabit alliance (WiGig)) based on a high frequency band is being developed. For example, a signal in the high frequency band may include a millimeter wave having a frequency band ranging from 20 GHz to 300 GHz. In the case where a signal in the high frequency band is used, a wavelength may become short, and an antenna and a device may become small-sized and/or lightweight.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including an antenna in the shape of an optimum structure and arrangement, which allow an antenna disposed on one side of the electronic device and an antenna structure including the antenna to have appropriate signal radiation performance, and a method for manufacturing the same.

As a signal in the high frequency band is used, the wavelength may shorten, and a relatively large number of antennas may be mounted on an electronic device within the same area. In contrast, because the directivity of radio waves becomes strong and the propagation path loss seriously occurs, propagation characteristics may be degraded.

For example, a communication module using a millimeter band above 20 GHz may include a small-sized antenna. An antenna may be mounted around a device where the antenna is disposed, any other device structure may be disposed in connection with an antenna, or a structure capable of affecting an antenna may be disposed to cover a direction in which a signal of the antenna is radiated. There is a demand on an antenna structure capable of showing signal radiation performance that a designer intends in this structure.

Additional aspects will be set forth in part in the description which follows and, in part, will be apparent from the description, or may be learned by practice of the presented embodiments.

In accordance with an aspect of the disclosure, an electronic device is provided. The electronic device includes housing that includes a first plate including at least a portion of an outer surface facing a first direction, a second plate including at least a portion of an outer surface facing a second direction opposite to the first direction, and a side member surrounding a space between the first plate and the second plate and coupled to the second plate or integrally formed with the second plate, a support member that is integrally formed with the side member or is coupled to the side member, is interposed between the first plate and the second plate, and includes a conductive portion, an antenna structure that is interposed between the second plate and the support member and includes at least one antenna pattern including at least a portion of a surface facing a third direction, which is substantially perpendicular to the first direction and faces the side member, and disposed to form a directional beam facing at least in the third direction, a non-conductive structure that is disposed in a space surrounded by the second plate, the support member, the side member, and the surface of the antenna structure and includes a body portion including a first end portion adjacent to a first region where the support member meets the side member, a second end portion adjacent to a second region where the surface of the antenna structure and an inner surface of the second plate are adjacent to each other, a first surface interposed between the first end portion and the second end portion and formed based on an outline of an inner surface of the second plate and/or an inner surface of the side member, and a second surface where a distance from the surface of the antenna structure increases as it goes toward the first end portion from the second end portion, when viewing a cross section cut in the third direction, and a wireless communication circuit that is electrically connected with the antenna pattern and transmits and/or receives a signal having between 3 GHZ and 100 GHZ.

In accordance with another aspect of the disclosure, an electronic device is provided. The electronic device includes a support member, a front plate disposed on a front surface of the support member, a back plate disposed on a back surface of the support member, a non-conductive structure interposed between the back plate and an edge of the support member and fixed to the support member, and an antenna structure interposed between the back plate and an edge of the support member, at least a portion of the antenna structure may be disposed to face the non-conductive structure, and in a region of the non-conductive structure, which faces the antenna structure, a separated distance from the antenna structure may vary depending on a distance from a bottom surface of the support member to which the non-conductive structure is fixed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 2A, 2B, and 2C illustrate an embodiment of a structure of an antenna module according to various embodiments of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
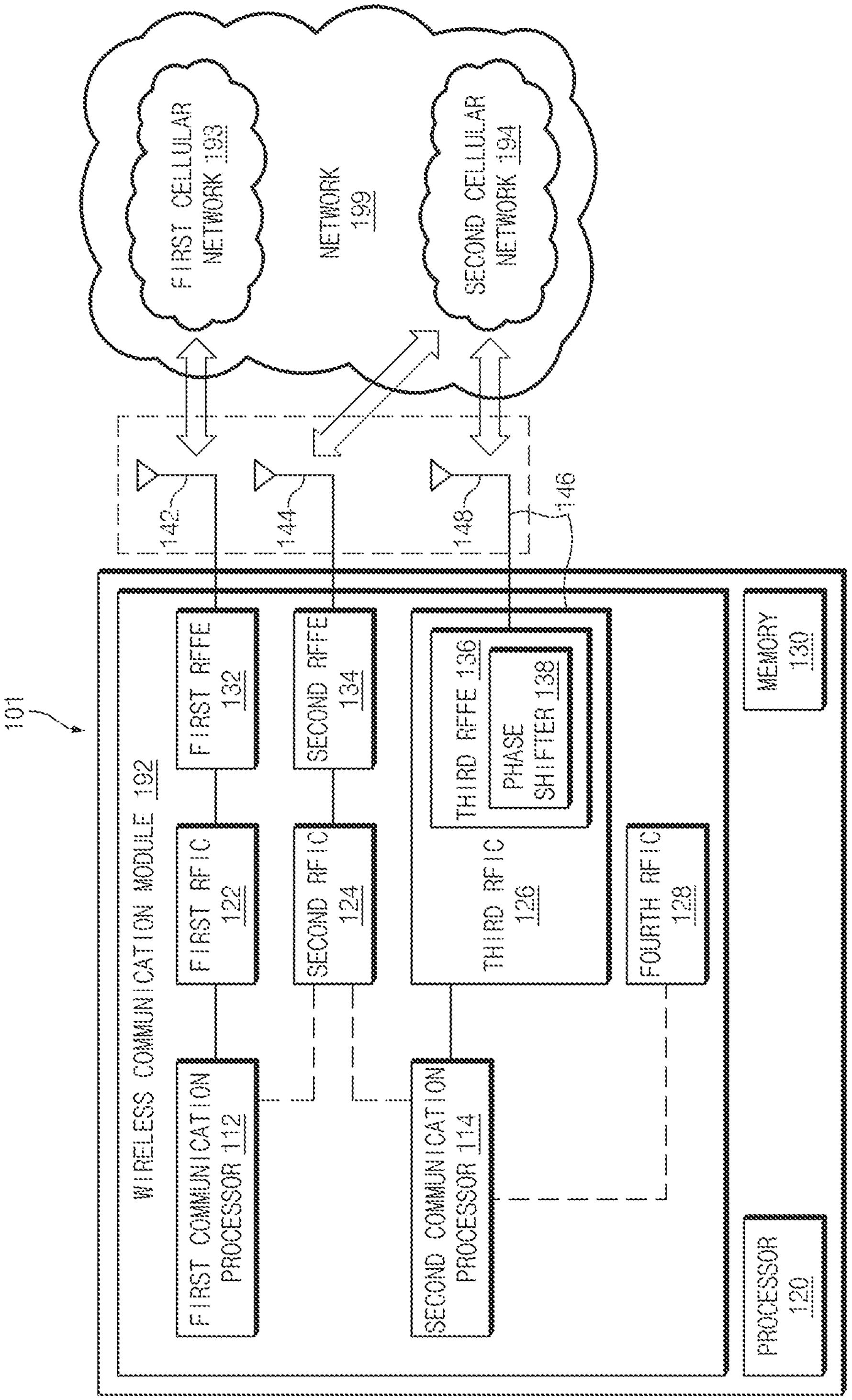
FIG. 1 is a block diagram of an electronic device for supporting legacy network communication and 5G network communication, according to an embodiment of the disclosure.

FIG. 1 is a block diagram of an electronic device 101 for supporting legacy network communication and 5G network communication, according to an embodiment of the disclosure.

Referring to FIG. 1, the electronic device 101 may include a first communication processor 112, a second communication processor 114, a first radio frequency integrated circuit (RFIC) 122, a second RFIC 124, a third RFIC 126, a fourth RFIC 128, a first radio frequency front end (RFFE) 132, a second RFFE 134, a first antenna 142, a second antenna 144, and an antenna 148. The electronic device 101 may further include a processor 120 and a memory 130. A network 199 may include a first network 193 (or a first cellular network) and a second network 194 (or a second cellular network). The electronic device 101 may further include at least one component not illustrated in FIG. 1, and the network 199 may further include at least another network. The first communication processor 112, the second communication processor 114, the first RFIC 122, the second RFIC 124, the fourth RFIC 128, the first RFFE 132, and the second RFFE 134 may form at least a portion of a wireless communication module 192. According to another embodiment of the disclosure, the fourth RFIC 128 may be omitted or may be included as a portion of the third RFIC 126.

The first communication processor 112 may establish a communication channel for a band to be used for wireless communication with the first network 193 and may support legacy network communication through the established communication channel. The first network 193 may be a legacy network including a 2nd generation (2G), 3G, 4G, or long term evolution (LTE) network. The second communication processor 114 may establish a communication channel corresponding to a specified band (e.g., ranging from approximately 6 GHz to approximately 60 GHZ) of bands to be used for wireless communication with the second network 194 and may support 5G network communication through the established communication channel. According to various embodiments, the second network 194 may be a 5G network defined in the 3GPP. Additionally, the first communication processor 112 or the second communication processor 114 may establish a communication channel corresponding to another specified band (e.g., approximately 6 GHz or lower) of the bands to be used for wireless communication with the second network 194 and may support 5G network communication through the established communication channel. The first communication processor 112 and the second communication processor 114 may be implemented in a single chip or a single package. According to various embodiments of the disclosure, the first communication processor 112 or the second communication processor 114 may be implemented in a single chip or a single package together with the processor 120, an auxiliary processor, or a communication module.

In the case of transmitting a signal, the first RFIC 122 may convert a baseband signal generated by the first communication processor 112 into a radio frequency (RF) signal of approximately 700 MHz to approximately 3 GHz that is used in the first network 193 (e.g., a legacy network). In the case of receiving a signal, an RF signal may be obtained from the first network 193 (e.g., a legacy network) through an antenna (e.g., the first antenna 142) and may be pre-processed through an RFFE (e.g., the first RFFE 132). The first RFIC 122 may convert the pre-processed RF signal into a baseband signal so as to be processed by the first communication processor 112.

In the case of transmitting a signal, the second RFIC 124 may convert a baseband signal generated by the first communication processor 112 or the second communication processor 114 into an RF signal (hereinafter referred to as a "5G Sub6 RF signal") in a Sub6 band (e.g., approximately 6 GHz or lower) used in the second network 194 (e.g., a 5G network). In the case of receiving a signal, the 5G Sub6 RF signal may be obtained from the second network 194 (e.g., a 5G network) through an antenna (e.g., the second antenna 144) and may be pre-processed through an RFFE (e.g., the second RFFE 134). The second RFIC 124 may convert the pre-processed 5G Sub6 RF signal into a baseband signal so as to be processed by a relevant communication processor of the first communication processor 112 or the second communication processor 114.

The third RFIC 126 may convert a baseband signal generated by the second communication processor 114 into an RF signal (hereinafter referred to as a "5G Above6 RF signal") in a 5G Above6 band (e.g., approximately 6 GHz to approximately 60 GHZ) to be used in the second network 194 (e.g., a 5G network). In the case of receiving a signal, the 5G Above6 RF signal may be obtained from the second network 194 (e.g., a 5G network) through an antenna (e.g., the antenna 148) and may be pre-processed through a third RFFE 136. The third RFFE 136 may include at least one phase shifter 138. The third RFIC 126 may convert the pre-processed 5G Above6 RF signal into a baseband signal so as to be processed by the second communication processor 114. According to an embodiment, the third RFFE 136 may be implemented as a portion of the third RFIC 126.

The electronic device 101 may include the fourth RFIC 128 independently of the third RFIC 126 or as at least a portion of the third RFIC 126. In this case, the fourth RFIC 128 may convert a baseband signal generated by the second communication processor 114 into an RF signal (hereinafter referred to as an "IF signal") in an intermediate frequency band (e.g., approximately 9 GHz to approximately 11 GHZ) and may provide the IF signal to the third RFIC 126. The third RFIC 126 may convert the IF signal into the 5G Above6 RF signal. In the case of receiving a signal, the 5G Above6 RF signal may be received from the second network 194 (e.g., a 5G network) through an antenna (e.g., the antenna 148) and may be converted into an IF signal by the third RFIC 126. The fourth RFIC 128 may convert the IF signal into a baseband signal so as to be processed by the second communication processor 114.

The first RFIC 122 and the second RFIC 124 may be implemented with a portion of a single package or a single chip. The first RFFE 132 and the second RFFE 134 may be implemented with a portion of a single package or a single chip. At least one antenna of the first antenna 142 or the second antenna 144 may be omitted or may be combined with any other antenna to process RF signals in a plurality of bands.

The third RFIC 126 and the antenna 148 may be disposed at the same substrate to form an antenna module 146. For example, the wireless communication module 192 or the processor 120 may be disposed at a first substrate (e.g., a main printed circuit board (PCB)). In this case, the third RFIC 126 may be disposed in a partial region (e.g., on a lower surface) of a second substrate (e.g., a sub PCB) independent of the first substrate, and the antenna 148 may be disposed in another partial region (e.g., on an upper surface) of the second substrate. As such, the antenna module 146 may be formed. The antenna 148 may include, for example, an antenna array capable of being used for beamforming. As the third RFIC 126 and the antenna 148 are disposed at the same substrate, it may be possible to decrease a length of a transmission line between the third RFIC 126 and the antenna 148. For example, the decrease in the transmission line may make it possible to reduce the loss (or attenuation) of a signal in a high frequency band (e.g., approximately 6 GHz to approximately 60 GHZ) used for the 5G network communication, due to the transmission line. As such, the electronic device 101 may improve the quality or speed of communication with the second network 194 (e.g., a 5G network).

The second network 194 (e.g., a 5G network) may be used independently of the first network 193 (e.g., a legacy network) (this scheme being called "stand-alone (SA)") or may be used in connection with the first network 193 (this scheme being called "non-stand alone (NSA)"). For example, an access network (e.g., a 5G radio access network (RAN) or a next generation RAN (NG RAN)) may be only present in the 5G network, and a core network (e.g., a next generation core (NGC)) may be absent from the 5G network. In this case, the electronic device 101 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 130 so as to be accessed by any other component (e.g., the processor 120, the first communication processor 112, or the second communication processor 114).

FIGS. 2A, 2B and 2C illustrate an embodiment of a structure of an antenna module 246 (e.g., the antenna module 146 of FIG. 1) according to various embodiments of the disclosure.

FIG. 2A is a perspective view of the antenna module 246 when viewed from one side, and FIG. 2B is a perspective view of the antenna module 246 when viewed from another side. FIG. 2C is a cross-sectional view of the antenna module 246 taken along line A-A' of FIG. 2A.

Referring to FIGS. 2A, 2B and 2C, the antenna module 246 may include a printed circuit board 210, an antenna array 230, a radio frequency integrated circuit (RFIC) 252, and a power manage integrated circuit (PMIC) 254. Selectively, the antenna module 246 may further include a shielding member 290. In other embodiments, at least one of the above components may be omitted, or at least two of the above components may be integrally formed.

The printed circuit board 210 may include a plurality of conductive layers and a plurality of non-conductive layers, and the conductive layers and the non-conductive layers may be alternately stacked. The printed circuit board 210 may provide electrical connection between various electronic components disposed on the printed circuit board 210 or on the outside, by using wires and conductive vias formed in the conductive layers.

The antenna array 230 (e.g., the antenna 148 of FIG. 1) may include a plurality of antenna elements 232, 234, 236, and 238 disposed to form a directional beam. The antenna elements 232, 234, 236, and 238 may be formed on a first surface of the printed circuit board 210 as illustrated. The antenna array 230 may alternatively be formed within the printed circuit board 210. The antenna array 230 may include a plurality of antenna arrays (e.g., a dipole antenna array and/or a patch antenna array) that are identical or different in shape or kind.

The RFIC 252 (e.g., the third RFIC 126 of FIG. 1) may be disposed in another region (e.g., on a second surface facing away from the first surface) of the printed circuit board 210, which is spaced from the antenna array 230. The RFIC 252 is configured to process a signal in a selected frequency band, which is transmitted/received through the antenna array 230. In the case of transmitting a signal, the RFIC 252 may convert a baseband signal obtained from a communication processor (not illustrated) into an RF signal in a specified band. In the case of receiving a signal, the RFIC 252 may convert an RF signal received through the antenna array 230 into a baseband signal and may provide the baseband signal to the communication processor.

According to another embodiment of the disclosure, in the case of transmitting a signal, the RFIC 252 may up-convert an IF signal (e.g., approximately 9 GHz to approximately 11 GHZ) obtained from an intermediate frequency integrated circuit (IFIC) (e.g., 128 of FIG. 1) into an RF signal. In the case of receiving a signal, the RFIC 252 may down-convert an RF signal obtained through the antenna array 230 into an IF signal and may provide the IF signal to the IFIC.

The PMIC 254 may be disposed in another region (e.g., on the second surface) of the printed circuit board 210, which is spaced from the antenna array 230. The PMIC 254 may be supplied with a voltage from a main PCB (not illustrated) and may provide a power necessary for various components (e.g., the RFIC 252) above the antenna module 246.

The shielding member 290 may be disposed at a portion (e.g., on the second surface) of the printed circuit board 210 such that at least one of the RFIC 252 or the PMIC 254 is electromagnetically shielded. The shielding member 290 may include a shield can.

Although not illustrated in drawings, the antenna module 246 may be electrically connected with another printed circuit board (e.g., a main circuit board) through a module interface. The module interface may include a connection member, for example, a coaxial cable connector, a board to board connector, an interposer, or a flexible printed circuit board (FPCB). The RFIC 252 and/or the PMIC 254 of the antenna module 246 may be electrically connected with the printed circuit board through the connection member.

Figure 3:
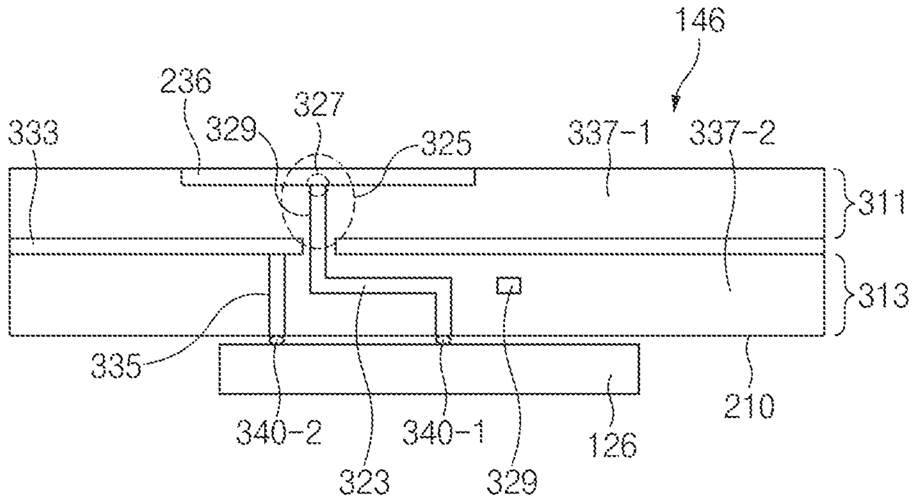
FIG. 3 illustrates a cross-sectional view of an antenna module taken along line B-B' of FIG. 2A according to an embodiment of the disclosure.

FIG. 3 illustrates a cross-sectional view of the antenna module 246 taken along line B-B' of FIG. 2A according to an embodiment of the disclosure.

Referring to FIG. 3, the printed circuit board 210 may include an antenna layer 311 and a network layer 313.

The antenna layer 311 may include at least one dielectric layer 337-1, and the antenna element 236 and/or a feeding part 325 formed on an outer surface of the dielectric layer 337-1 or therein. The feeding part 325 may include a feeding point 327 and/or a feeding line.

The network layer 313 may include at least one dielectric layer 337-2; and at least one ground layer 333, at least one conductive via 335, a transmission line 323, and/or a signal line 329 formed on an outer surface of the dielectric layer 337-2 or therein.

In addition, in the embodiment illustrated, the third RFIC 126 of FIG. 1 may be electrically connected with the network layer 313, for example, through first and second connection parts (e.g., solder bumps) 340-1 and 340-2. In other embodiments, various connection structures (e.g., soldering or a ball grid array (BGA)) may be utilized instead of a connection part. The third RFIC 126 may be electrically connected with the antenna element 236 through the first connection part 340-1, the transmission line 323, and the feeding part 325. The third RFIC 126 may also be electrically connected with the ground layer 333 through the second connection part 340-2 and the conductive via 335. Although not illustrated in drawings, the third RFIC 126 may also be electrically connected with the above module interface through the signal line 329.

Figure 4:
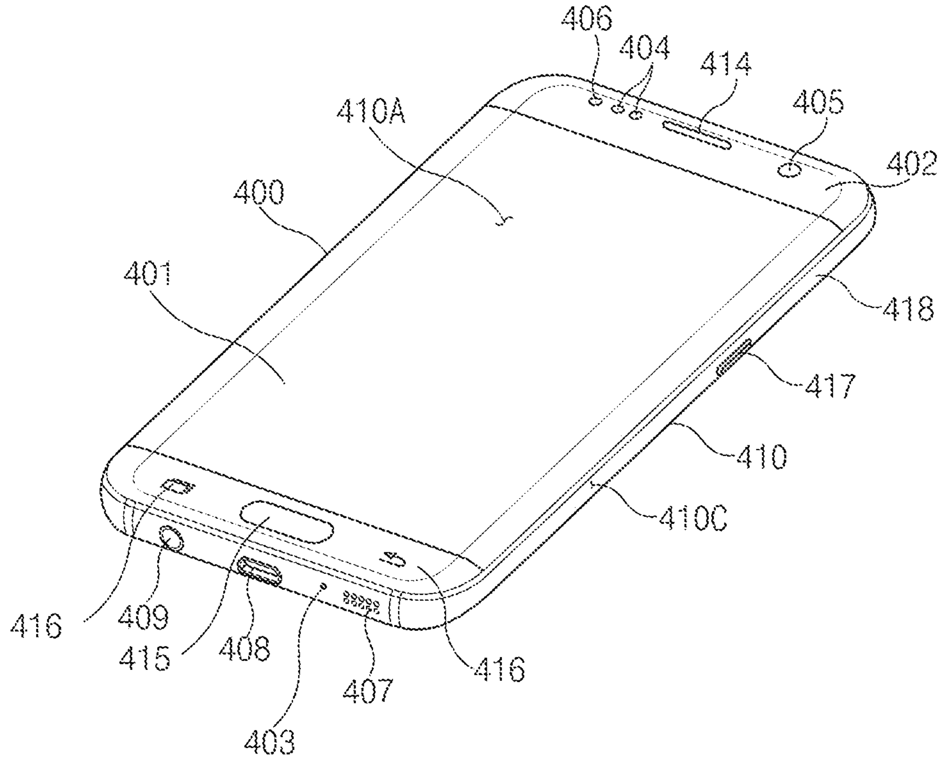
FIG. 4 is a view illustrating an example of a front exterior of an electronic device according to an embodiment of the disclosure.

FIG. 4 is a view illustrating an example of a front exterior of an electronic device according to an embodiment of the disclosure.

Figure 5:
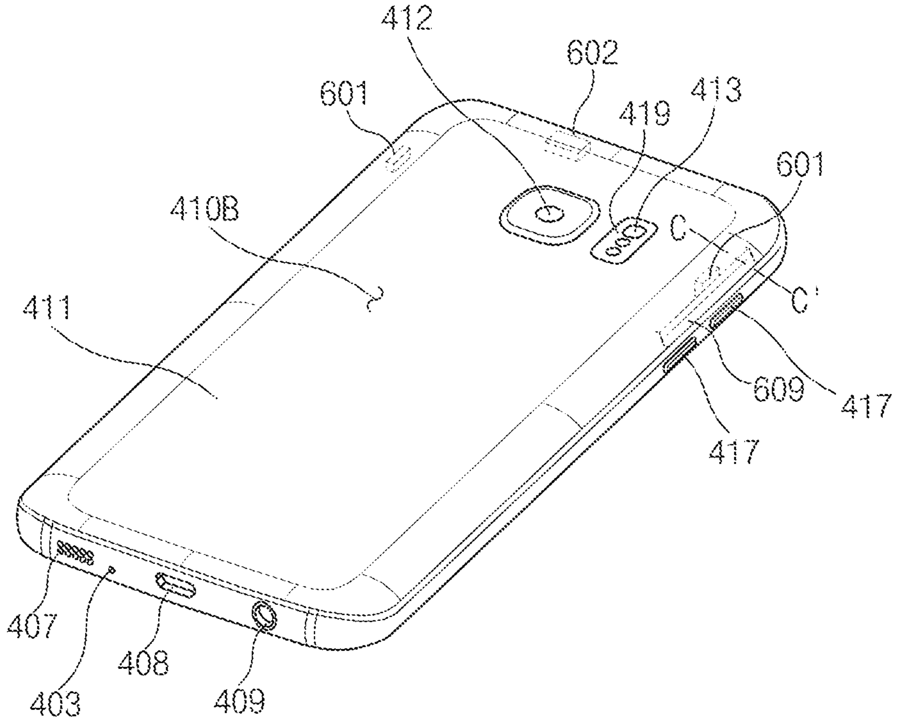
FIG. 5 is a view illustrating an example of a back exterior of an electronic device according to an embodiment of the disclosure.

FIG. 5 is a view illustrating an example of a back exterior of an electronic device according to an embodiment of the disclosure.

Referring to FIGS. 4 and 5, an electronic device 400 according to an embodiment of the disclosure may include a housing 410 including a first surface (or a front surface) 410A, a second surface (or a back surface) 410B, and a side surface 410C surrounding a space between the first surface 410A and the second surface 410B. In another embodiment of the disclosure (not illustrated), a housing may refer to a structure that forms a part of the first surface 410A, the second surface 410B, and the side surface 410C of FIG. 4. The first surface 410A may be formed by a front plate 402 (e.g., a glass plate including various coating layers, or a polymer plate), at least a portion of which is substantially transparent. The second surface 410B may be formed by a back plate 411 that is substantially opaque. For example, the back plate 411 may be formed by a coated or colored glass, a ceramic, a polymer, a metal (e.g., aluminum, stainless steel (STS), or magnesium), or a combination of at least two of the materials. The side surface 410C may be coupled to the front plate 402 and the back plate 411, and may be formed by a side bezel structure (e.g., the side member 418) including metal and/or polymer. The back plate 411 and the side bezel structure may be integrally formed and may be formed of the same material (e.g., a metal material such as aluminum).

The electronic device 400 may include at least one or more of a display 401, an audio module (403, 407, 414), a sensor module (404, 419), a camera module (405, 412, 413), a key input device (415, 416, 417), an indicator 406, and a connector hole (408, 409). In any embodiment, the electronic device 400 may not include at least one (e.g., the key input device (415, 416, 417) or the indicator 406) of the components or may further include any other component.

The display 401 may be exposed, for example, through a considerable portion of the front plate 402. The display 401 may be coupled to a touch sensing circuit, a pressure sensor capable of measuring the intensity (or pressure) of a touch, and/or a digitizer detecting a magnetic stylus pen or may be disposed adjacent thereto.

The audio module (403, 407, 414) may include the microphone hole 403 and the speaker hole (407, 414). A microphone for obtaining external sound may be disposed within the microphone hole 403; a plurality of microphones may be disposed to detect a direction of sound. The speaker hole (407, 414) may include the external speaker hole 407 and the receiver hole 414 for call. In any embodiment, the speaker hole (407, 414) and the microphone hole 403 may be implemented with one hole, or a speaker (e.g., a piezo speaker) may be included without the speaker hole (407, 414).

The sensor module (404, 419) may generate an electrical signal or a data value that corresponds to an internal operation state of the electronic device 400 or corresponds to an external environment state. The sensor module (404, 419) may include, for example, the first sensor module 404 (e.g., a proximity sensor) and/or a second sensor module (not illustrated) (e.g., a fingerprint sensor) disposed on the first surface 410A of the housing 410, and/or the third sensor module 419 (e.g., a heart rate monitor (HRM) sensor) disposed on the second surface 410B of the housing 410. The fingerprint sensor may be disposed on the second surface 410B as well as the first surface 410A (e.g., the home key button 415) of the housing 410. The electronic device 400 may further include a sensor module not illustrated, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or the illumination sensor 404.

The camera module (405, 412, 413) may include the first camera device 405 disposed on the first surface 410A of the electronic device 400, and the second camera device 412 and/or the flash 413 disposed on the second surface 410B. The camera module (405, 412) may include one or more lenses, an image sensor, and/or an image signal processor. The flash 413 may include, for example, a light-emitting diode or a xenon lamp. In any embodiment, two or more lenses (e.g., wide-angle and telephoto lens) and image sensors may be disposed on one surface of the electronic device 400.

The key input device (415, 416, 417) may include the home key button 415 disposed on the first surface 410A of the housing 410, the touch pad 416 disposed in the vicinity of the home key button 415, and/or the side key button 417 disposed on the side surface 410C of the housing 410. The electronic device 400 need not include all or a part of the aforementioned key input devices 415, 416, and 417, and the key input device (415, 416, 417) not included may be implemented in the form of a soft key on the display 401.

The indicator 406 may be disposed, for example, on the first surface 410A of the housing 410. The indicator 406 may provide state information of the electronic device 400, for example, in the form of light, and may include an light emitting diode (LED).

The connector hole (408, 409) may include the first connector hole 408 capable of accommodating a connector (e.g., a USB connector) for transmitting/receiving a power and/or data with an external electronic device, and/or the second connector hole (or an earphone jack) 409 capable of accommodating a connector for transmitting/receiving an audio signal with the external electronic device.

At least one antenna structure 601 or 602 (or antenna module) corresponding to the antenna 148 of the wireless communication module 192 may be disposed on one side of the electronic device 400. For example, as illustrated in FIG. 5, the antenna structures 601 and 602 may be interposed between the front plate 402 and the back plate 411 disposed on the second surface 410B of the electronic device 400. The first antenna structure 601 of the antenna structures 601 and 602 may be disposed at an edge of a side wall of the electronic device 400. For another example, the second antenna structure 602 may be disposed to face the second surface 410B.

A non-conductive structure 609 (or a non-conductive member) of a non-conductive material may be disposed in a signal radiation direction of the first antenna structure 601. The non-conductive structure 609 may be disposed at least a portion of an inner side of the housing 410, and at least a portion thereof may be disposed adjacent to a region where the first antenna structure 601 is disposed. The non-conductive structure 609 may be fixed to the housing 410 and may be disposed to be physically spaced from the first antenna structure 601 as much as a specified minimum distance. With regard to improvement of a signal radiation characteristic of an antenna, a partial region of the non-conductive structure 609, which faces the first antenna structure 601, may be formed to be different in shape from a non-conductive structure around the partial region. At least a portion of the partial region of the non-conductive structure 609, which faces the first antenna structure 601, may form an asymmetrical surface with respect to at least a portion of a surface of the first antenna structure 601 inwardly (e.g., from a direction facing the first antenna structure 601 to an outward direction of the housing 410).

At least a portion of the region of the non-conductive structure 609, which faces the first antenna structure 601, may be inwardly inclined as much as a given depth and may form an empty space by peripheral structures (e.g., at least a portion of a surface of the non-conductive structure 609, at least a portion of a surface of the first antenna structure 601, and at least a portion of a surface of a first support member 608 of FIG. 6 to be described later). At least a portion of an outer side of the non-conductive structure 609 in a direction of a back plate may be formed to be round, at least a portion of a bottom surface connected with the housing 410 may be fixed to the housing 410, the region facing the first antenna structure 601 may include an empty space of a given size or at least one lattice space where a space is partitioned by at least one separating wall. In illustrated drawings and descriptions, an example is described as an edge of the back plate 411 may have a shape bent in at least one direction (or a shape having a given curvature value) and at least a portion of an outer surface (e.g., a surface adjacent to the back plate 411) of the non-conductive structure 609 has a bent shape, but the inventive concept is not limited thereto. For example, the back plate 411 may not include a bent region and may include only a flat surface. In this case, an outside region of a shape of the non-conductive structure 609 may include an angled corner.

As described above with reference to FIGS. 2A through 2C, the first antenna structure 601 may be formed of an antenna array (e.g., the antenna array 230) where a plurality of patch antennas (e.g., the plurality of antenna elements 232, 234, 236, and 238 of FIGS. 2A through 2C) are arranged; in this case, the plurality of patch antennas may be disposed at a substrate for the first antenna structure 601 so as to be spaced from each other as much as a given distance.

In the case where the non-conductive structure 609 includes a plurality of empty spaces separated from each other, at least one of the empty spaces may be disposed at a location where the at least one empty space faces at least one of the patch antennas. The non-conductive structure 609 may further include separating walls for separating empty spaces, and the separating walls may be disposed to face an interval between the patch antennas or not to overlap the patch antennas (e.g., the plurality of antenna elements 232, 234, 236, and 238 of FIGS. 2A through 2C), when viewed from the outside of a side bezel structure 606. The electronic device 101 may include a support member (e.g., the first support member 608) supporting the first antenna structure 601, the support member may include a conductive portion and another conductive portion, an opening may be formed between the conductive portion and the other conductive portion, and at least a portion of a non-conductive structure 609 (or a non-conductive member) may be disposed to fill the opening. In this case, the non-conductive structure 609 (or a non-conductive member) may contact the conductive portion and the other conductive portion.

A volume of the region of the non-conductive structure 609, which faces the first antenna structure 601, may be formed to be smaller than a volume of a peripheral region of the non-conductive structure 609. For example, at least a partial surface of the non-conductive structure 609, which corresponds to the region thereof facing the first antenna structure 601, may be formed with a given slope (e.g., may be formed with a flat surface and to have a given slope or may be formed with a curved surface). At least a portion of a surface of the non-conductive structure 609 may be formed in a shape having a given slope (e.g., in the shape of a slant) inwardly (toward the outside from the interior of the housing 410). As such, when the first antenna structure 601 is disposed to face the side bezel structure 606 of the housing 410, a thickness of a portion of the non-conductive structure 609, which faces an upper end of the first antenna structure 601 (e.g., an upper end of the first antenna structure 601 when viewed from above the back plate 411), a thickness of a portion of the non-conductive structure 609, which faces a middle portion of the first antenna structure 601, and a thickness of a portion of the non-conductive structure 609, which faces a lower end of the first antenna structure 601 may be differently formed.

When assembled, the thickness of the portion of the non-conductive structure 609, which faces the upper end of the first antenna structure 601 adjacent to an inner side of the back plate 411, may be identical or similar to the thickness of the portion of the non-conductive structure 609, which faces the lower end of the first antenna structure 601 relative to the upper end (e.g., similar within a given ratio). The thickness of the portion of the non-conductive structure 609, which faces the lower portion of the first antenna structure 601, may be thicker than any other region. An inner surface of the non-conductive structure 609 may be formed to be stepped, and thus, a straight distance from the first antenna structure 601 to one surface (stepped surface) of the non-conductive structure 609 may be formed to be identical or similar as much as a given height.

Figure 6:
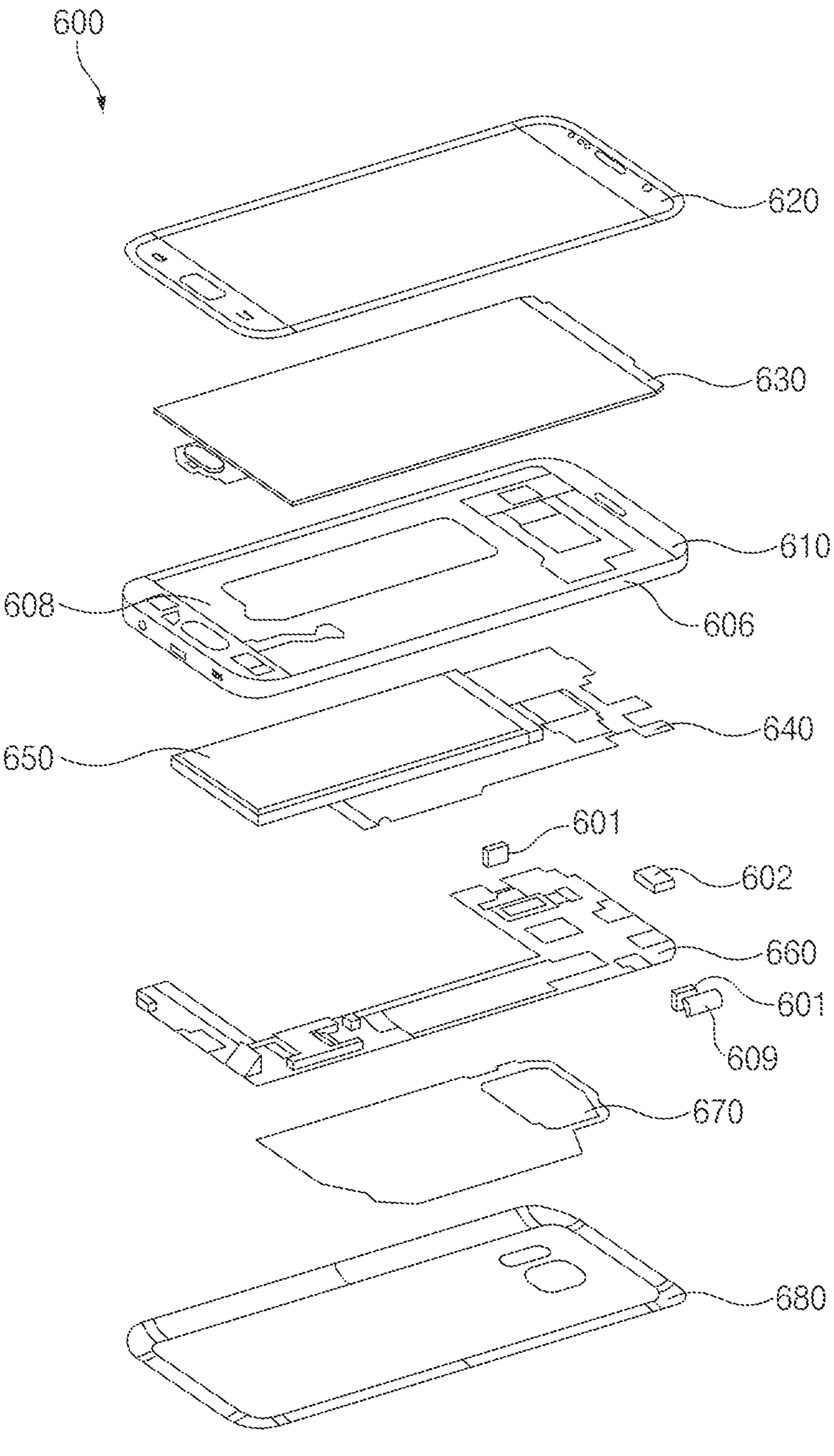
FIG. 6 is a view illustrating an example of an exploded structure of an electronic device according to an embodiment of the disclosure.

FIG. 6 is a view illustrating an example of an exploded structure of an electronic device according to an embodiment of the disclosure.

Referring to FIG. 6, an electronic device 600 may include the side bezel structure 606, a first support member 608 (e.g., a bracket or at least a portion of the housing 410 of FIGS. 4 and 5), a front plate 620 (or an external protective layer), a display 630, a printed circuit board 640, a battery 650, a second support member 660 (e.g., a rear case), an antenna 670, and a back plate 680 (or a back cover). The electronic device 600 may omit at least one (e.g., the first support member 608 or the second support member 660) of the components or may further include any other component. The side bezel structure 606 and the first support member 608 may form a portion of a housing 610. At least one of the components of the electronic device 600 may be identical or similar to at least one of the components of the electronic device 400 of FIG. 4 or 5, and thus, additional description will be omitted to avoid redundancy.

The first support member 608 may be disposed within the electronic device 600 so as to be connected with the side bezel structure 606 or may be integrally formed with the side bezel structure 606. The first support member 608 may be formed of, for example, a metal material and/or a nonmetal material (e.g., polymer). The display 630 may be coupled to one surface of the first support member 608, and the printed circuit board 640 may be coupled to an opposite surface of the first support member 608. A processor, a memory, and/or an interface may be mounted on the printed circuit board 640. For example, the processor may include one or more of a central processing unit, an application processor, a graphics processing device, an image signal processor, a sensor hub processor, or a communication processor.

The memory may include a volatile memory or a non-volatile memory.

The interface may include a high definition multimedia interface (HDMI), a universal serial bus (USB) interface, a secure digital (SD) card interface, and/or an audio interface. The interface may electrically or physically connect, for example, the electronic device 600 with an external electronic device and may include a USB connector, an SD card/MMC connector, or an audio connector.

The battery 650 is a device for supplying a power to at least one component of the electronic device 600 and may include a primary cell incapable of being recharged, a secondary cell rechargeable, or a fuel cell. At least a portion of the battery 650 may be disposed on substantially the same plane as the printed circuit board 640, for example. The battery 650 may be integrally disposed within the electronic device 600, or may be disposed to be removable from the electronic device 600.

The antenna 670 may be interposed between the back plate 680 and the battery 650. The antenna 670 may include a near field communication (NFC) antenna, an antenna for wireless charging, and/or a magnetic secure transmission (MST) antenna. For example, the antenna 670 may perform short range communication with an external device or may wirelessly transmit/receive a power necessary to charge. An antenna structure may be formed by a portion of the side bezel structure 606 and/or the first support member 608, or by a combination thereof.

The antenna structures 601 and 602 may be directly fixed to one side of the printed circuit board 640 or may be fixed to one side of the printed circuit board 640 through the second support member 660. The antenna structures 601 and 602 may be electrically connected with the printed circuit board 640 and may form a communication path with at least some components (e.g., at least one of the third RFIC 126 and the fourth RFIC 128) of a wireless communication module (e.g., 192 of FIG. 1) disposed on the printed circuit board 640. The printed circuit board 640 where the antenna structures 601 and 602 are seated may be fixed to one side (e.g., one side of an edge) of the first support member 608 (or at least a portion of a housing) and may be disposed to face a direction of a side wall of the first support member 608. As such, at least one (e.g., the first antenna structure 601) of the antenna structures 601 and 602 may be disposed to face at least a portion of the non-conductive structure 609 (e.g., the non-conductive structure 609 of FIG. 5) disposed on a side wall of the first support member 608 and may be disposed adjacent to the non-conductive structure 609. The first antenna structure 601 and the non-conductive structure 609 may be disposed to be spaced from each other as much as a given distance.

Figure 7:
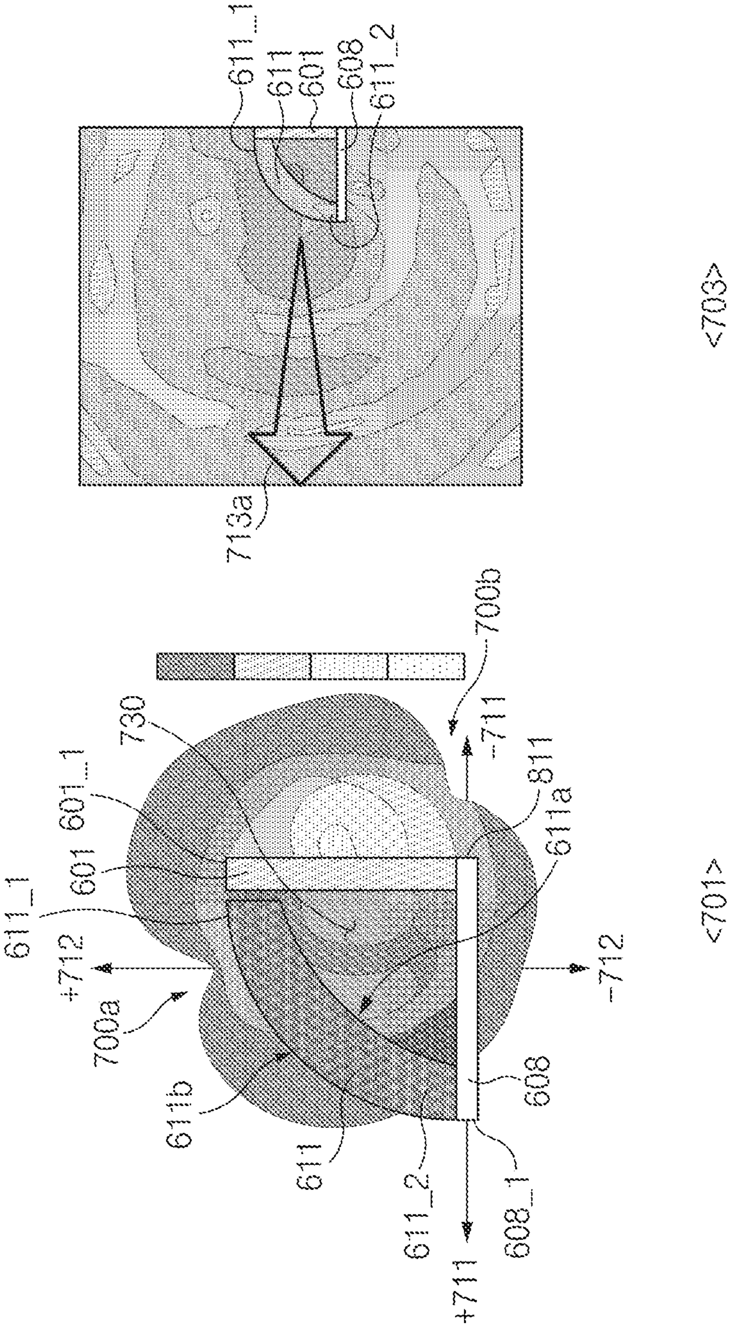
FIG. 7 is a view illustrating an example of a partial configuration of an electronic device, which corresponds to a cross section taken along line C-C' of FIG. 5 according to an embodiment of the disclosure.

FIG. 7 is a view illustrating an example of a partial configuration of an electronic device, which corresponds to a cross section taken along line C-C' of FIG. 5 according to an embodiment of the disclosure.

FIG. 7 may be a drawing illustrating an example of an electronic device environment where an antenna including a first antenna, a first non-conductive structure, and a housing is disposed, according to various embodiments of the disclosure. For convenience of description, at least a portion of a first antenna, a portion of a first non-conductive structure, and a portion of a housing are illustrated in FIG. 7, but the inventive concept is not limited thereto. For example, the electronic device environment may further include a component such as a printed circuit board connected with the first antenna, at least one of a back plate and a rear case surrounding at least a portion of the printed circuit board, or a display.

Referring FIG. 7, in state 701, at least a portion of a configuration of an electronic device according to an embodiment may include the first support member 608 (e.g., the first support member 608 of FIG. 6), a first non-conductive structure 611 (or a partial region of a side portion of a non-conductive structure), and/or the first antenna structure 601.

The first support member 608 may be disposed in a first direction +711 as much as a given length. The first antenna structure 601 may be disposed at a first point 811 on an inner side of the first support member 608, and the first support member 608 and the first antenna structure 601 may be disposed to be perpendicular to each other. At least a portion of the first non-conductive structure 611 may be disposed at one end portion (e.g., one side of an edge or an outer end portion 608_1) of the first support member 608.

At least a portion of a cross section of the first non-conductive structure 611 may be formed in the shape of an arc having a given angle (e.g., between 30 to 120 degrees, for example, 90 degrees). The cross section of the first non-conductive structure 611 may be formed of a portion of a shape of a circular band (e.g., a quarter of a shape of a circular band), and the one side 611_2 may be disposed above the first support member 608 and adjacent thereto or may contact the first support member 608. An opposite side 611_1 of the first non-conductive structure 611 may be disposed to be spaced from the first antenna structure 601 as much as a specified distance. The first non-conductive structure 611 may be formed in a shape in which an inner side in the first direction +711 with respect to the first antenna structure 601 is empty. A first surface 611*a* (e.g., an inner wall) of the first non-conductive structure 611 may be formed in the shape of an arc, in which a distance to the first surface 611*a* of the first non-conductive structure 611 from the first point 811 where the first support member 608 meets the first antenna structure 601 is uniform. Also, a second surface 611*b* (e.g., an outer wall) of the first non-conductive structure 611 may be formed in the shape of an arc corresponding to the first surface 611*a*. Alternatively, the first non-conductive structure 611 may extend from a point 611_1, which is spaced from an upper end 601_1 of the first antenna structure 601 in the first direction +711 as much as a given distance, to the one end portion 608_1 of the first support member 608 (e.g., an outer portion of the first support member 608 in the first direction +711), may form an empty space of a given size in a direction between the first direction +711 and a second direction +712 at the first point 811 together with a surrounding structure (e.g., the first support member 608) and the first antenna structure 601, and may be formed in a shape where at least one surface of the outer surface and the inner surface of the first non-conductive structure 611 is convex toward the outside (e.g., in a direction between the first direction +711 and the second direction +712 at the first point 811). The drawing illustrated in FIG. 7 corresponds a shape of the cross section of the first non-conductive structure 611, and the first non-conductive structure 611 may have the cross section illustrated in FIG. 7 and may be formed to have a given length along a direction of one side of an electronic device.

The electronic device may include an empty space 730, of which at least a portion is surrounded by the non-conductive structure 611, the first support member 608, and the first antenna structure 601. The non-conductive structure 611 may include the outer surface 611*b* and the inner surface 611*a*, which are convex in a first diagonal direction between the first direction +711 and the second direction +712.

The first antenna structure 601 may be formed in the shape of the antenna array 230 described above with reference to FIGS. 2A through 2C. In the drawing illustrated, the first antenna structure 601 may be disposed to radiate a signal in the first direction +711 mainly. For example, at least a portion of a printed circuit board that supplies a power and a signal to the first antenna structure 601 may be disposed in one region of the first antenna structure 601 in a direction opposite to the first direction +711. The first antenna structure 601 may radiate a signal transferred from the printed circuit board in a first direction, and due to a signal radiation characteristic, at least a portion of the signal may be radiated in different directions (e.g., the second direction +712 perpendicular to the first direction +711 or a third direction-711 opposite to the first direction +711 in the drawing illustrated) around the first antenna structure 601. The radiation characteristic of the signal radiated through the first antenna structure 601 may have an influence of the first non-conductive structure 611 and the first support member 608; as illustrated, a radiation pattern may be formed in an apple shape where valleys 700*a* and 700*b* lower than surrounding portions are formed in the first diagonal direction between the first direction +711 and the second direction +712 and a second diagonal direction between the third direction-711 and a fourth direction-712 with respect to the first antenna structure 601. A signal propagation characteristic may be changed as the signal radiated from the first antenna structure 601 transmits the first non-conductive structure 611, and regions of the valleys 700*a* and 700*b* may be formed as the propagation characteristic is changed by the first support member 608 of a metal material (e.g., the signal is reflected by the first support member 608). The first antenna structure 601 may be disposed such that a main portion 713*a* of the signal radiation faces the first direction +711. Even though the first antenna structure 601 of the electronic device is designed in such a way that a good signal characteristic appears in a plurality of direction, the regions of the valleys 700*a* and 700*b* where a signal characteristic is lower than in a surrounding region may appear.

Referring to state 703, the one side 611_2 of the first non-conductive structure 611 of an arc shape having a uniform thickness may be disposed on one end portion (e.g., 608_1) of the first support member 608, and the opposite side 611_1 may be disposed to be close to the upper end 601_1 of the first antenna structure 601. This structure of the non-conductive structure 611 may allow the signal radiated from the first antenna structure 601 to have a relatively good output characteristic in the first direction +711 compared with any other direction.

Figure 8:
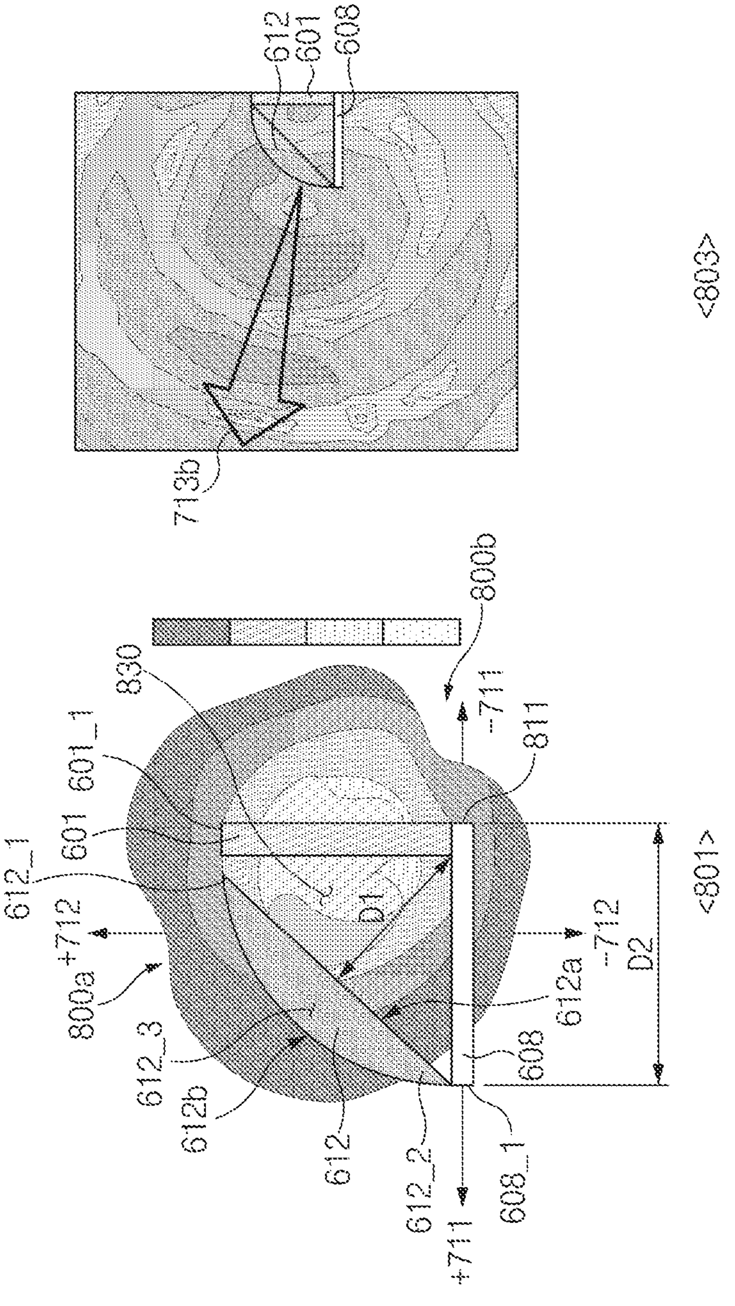
FIG. 8 is a view illustrating an example of a partial configuration of an electronic device, which corresponds to another cross section taken along line C-C' of FIG. 5 according to an embodiment of the disclosure.

FIG. 8 is a view illustrating an example of a partial configuration of an electronic device, which corresponds to another cross section taken along line C-C' of FIG. 5 according to an embodiment of the disclosure. Alternatively, FIG. 8 may be a drawing illustrating an example of an electronic device environment where an antenna including the first antenna structure 601, a second non-conductive structure 612, and the first support member 608 is disposed, according to an embodiment of the disclosure.

Referring FIG. 8, in state 801 at least a portion of a configuration of an electronic device according to an embodiment may include the first support member 608 (e.g., a partial region of a side portion of a housing or at least a portion of the first support member 608 of FIG. 6), the second non-conductive structure 612 (or a partial region of a side portion of a non-conductive structure), and/or the first antenna structure 601. The first support member 608 and the first antenna structure 601 may be identical or similar to the first support member 608 and the first antenna structure 601 described above with reference to FIG. 7.

The second non-conductive structure 612 may be formed in a convex-concave shape where the interior is filled and at least one surface is convex (or in an embossing shape or in a lenticular lens shape). An edge 612_1 or 612_2 of the second non-conductive structure 612 may be formed to be thinner than a central portion 612_3 thereof. One edge 612_1 of the second non-conductive structure 612 may be disposed adjacent to the upper end 601_1 of the first antenna structure 601, and the opposite edge 612_2 of the second non-conductive structure 612 may be disposed adjacent to the one end portion 608_1 of the first support member 608 (e.g., an outer portion in the first direction +711) or may be seated and fixed to the one end portion 608_1 of the first support member 608. The second non-conductive structure 612 may be formed with a given slope from the one edge 612_1 of the second non-conductive structure 612 to the opposite edge 612_2. A distance from the first point 811 where the first antenna structure 601 meets the first support member 608 to one surface **612*a* (e.g., an inner wall) of the second non-conductive structure 612 may vary depending on each location of the one surface of the second non-conductive structure 612. For example, the distance D1 from the first point 811 where the first antenna structure 601 meets the first support member 608 to the center of the one surface 612*a* of the second non-conductive structure 612 may be shorter than a surrounding distance D2. An empty space 830 (or a separation space) may be formed between the second non-conductive structure 612 and the first support member 608 or the second non-conductive structure 612 and the first antenna structure 601. As illustrated in FIG. 8, the empty space 830 may include a space that is surrounded by a surface (e.g., the one surface 612*a* of the second non-conductive structure 612) formed with a uniform gradient from the upper end 601_1 of the antenna to one point of the housing, the first antenna structure 601, and the first support member 608** and of which a cross section is in the shape of a triangle.

While the signal radiated from the first antenna structure 601 progresses in the first direction +711, the signal may have an influence of the first support member 608 and the second non-conductive structure 612 and may have a signal radiation characteristic of a pattern that is formed as illustrated in FIG. 8. Compared with the signal radiation characteristic affected by the first non-conductive structure 611 and the first support member 608 described above with reference to FIG. 7, valleys **800*a* and 800*b* may be formed to be smoother. Compared with the electronic device having the empty space 730 disclosed in FIG. 7, the electronic device having the empty space 830 as illustrated may reduce the size of a valley region (or may solve a Null region) and may allow main waves (or a radiation pattern) of the first antenna structure 601 to be focused in the first direction +711. The electronic device having the empty space 830 may adjust a main radiation pattern direction of an antenna signal 713*b* by using the non-conductive structure 612, of which a thickness varies depending on a signal radiation direction of the first antenna structure 601 (or a signal radiated in parallel with the first direction +711 at each point of the first antenna structure 601** in a vertical direction).

Referring to state 803 of FIG. 8, the signal radiated from the first antenna structure 601 may progress mainly from the first direction +711 to the second direction +712 (e.g., the radiated signal is oriented to a second plate (e.g., the back plate 680 of FIG. 6) so as to be somewhat upward and progresses (e.g., progresses toward the outside with respect to a side surface between a first plate (e.g., the front plate 620 of FIG. 6) and the second plate (e.g., the back plate 680 of FIG. 6) and is biased toward the second plate). Compared with the main signal radiation pattern direction in state 703 of FIG. 7, the main signal radiation pattern direction in state 803 of FIG. 8 may have a characteristic of signal progression somewhat oriented to an upper side; however, as valley (**800*a*, 800*b*) (or Null) regions become relatively smooth, an antenna structure (e.g., the first support member 608, the first antenna structure 601, and the second non-conductive structure 612) illustrated in FIG. 8 may have a better signal characteristic than an antenna structure (e.g., the first support member 608, the first antenna structure 601, and the first non-conductive structure 611) illustrated in FIG. 7. At least a portion of an inner surface of the second non-conductive structure 612 illustrated in FIG. 8 may include a surface that is formed with a uniform slope from an upper end portion of the first antenna structure 601 to one point of the first support member 608**.

Figure 9:
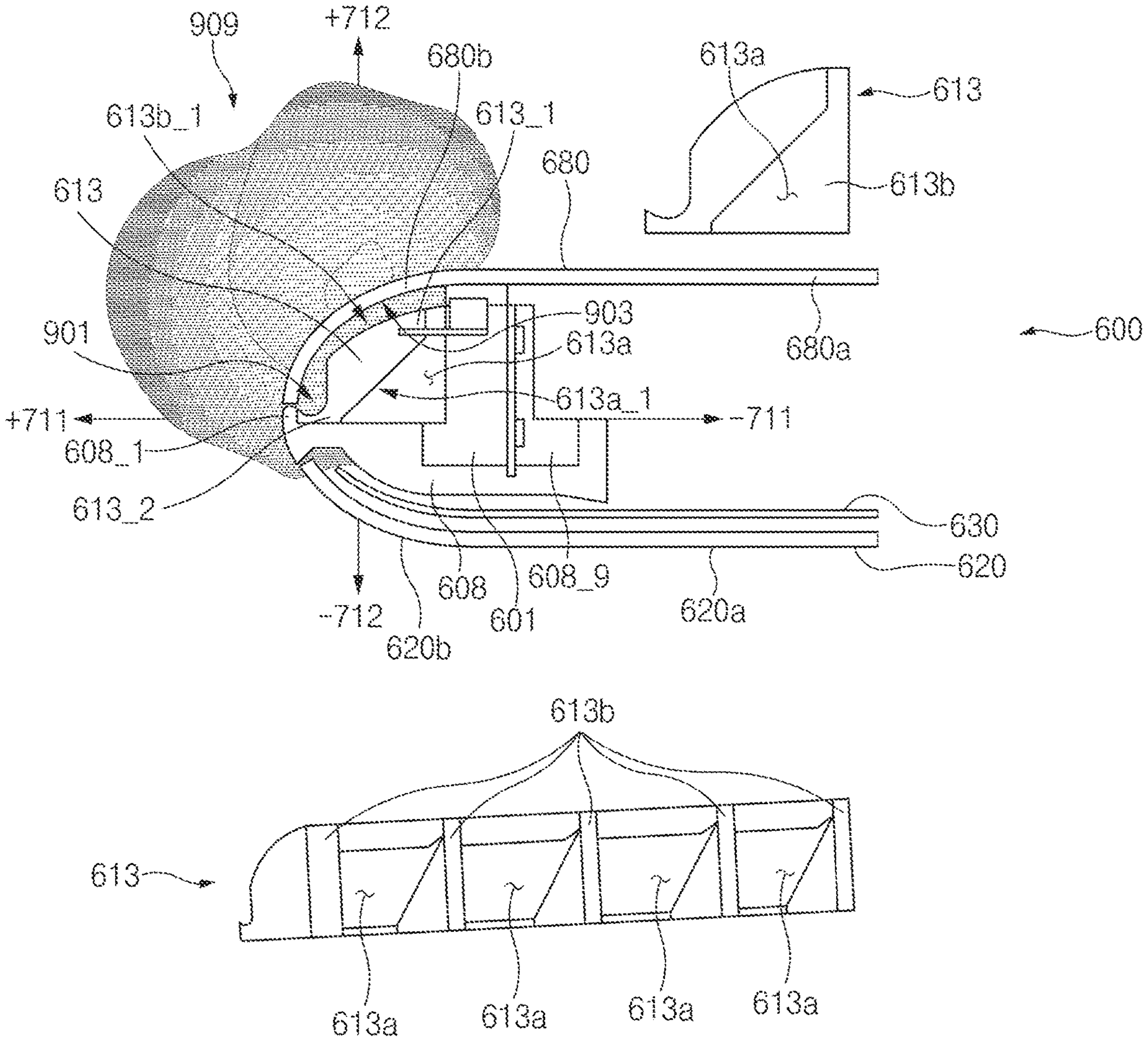
FIG. 9 is a view illustrating an example of a cross section taken along line C-C' of FIG. 5 according to an embodiment of the disclosure.

FIG. 9 is a view illustrating an example of a cross section taken along line C-C' of FIG. 5 according to an embodiment of the disclosure.

Referring to FIG. 9, the electronic device 600 may include the front plate 620 (or an external protective layer or a window panel), the display 630, the first support member 608, the back plate 680 (or a back panel or a back cover), a third non-conductive structure 613, and/or the first antenna structure 601 (or an antenna module).

A central portion **620*a* of the front plate 620 may be formed to be flat, and an edge portion 620*b*** thereof may be formed in a curved shape.

The display 630 may output data stored in a memory of the electronic device 600 through a specified screen interface under control of a processor. The display 630 may output an indicator or information associated with an operation of at least one antenna of the antennas. Alternatively, the display 630 may output an operation state of a communication network based on the antennas.

At least a portion of the first support member 608 may be formed of a metal material. The third non-conductive structure 613 may be disposed on one side of the first support member 608. At least a portion of a central portion of the first support member 608 may be formed to be flat, and at least a portion of an edge thereof (e.g., a surface on which the display 630 or the front plate 620) may be formed in a curved shape. At least a portion of the first support member 608 may include an antenna support member 608_9 supporting one side of the antenna structure 601.

A central portion 680*a* of the back plate 680 may be formed to be flat, and an edge 680*b* thereof may be formed in a curved shape. At least a portion of the back plate 680 may be formed of a nonmetal material such as ceramic, glass, plastic, or polymer. At least a portion of the remaining portion of the back plate 680 may be formed of a metal material.

At least one first antenna structure 601 may be interposed between the first support member 608 and the back plate 680. For example, as described with reference to FIG. 5 or FIG. 6, the first antenna structure 601 may be disposed to face the back plate 680 of the electronic device 600 or may be disposed to face at least one of left and right side surfaces. The first antenna structure 601 may be disposed to form a given angle with one surface of the first support member 608 (e.g., disposed along the second direction +712) and may radiate a signal in a direction (e.g., the first direction +711) that is parallel to the first support member 608.

At least a portion of a first end portion 613_2 of the third non-conductive structure 613 may be fixed to the first support member 608, and at least a portion of a second end portion 613_1 may be extended and formed toward the first antenna structure 601. For example, at least a portion of a surface 613*b*_1 of the third non-conductive structure 613, which faces an inner side 903 of the back plate 680, may be formed in a curved shape, and at least a portion of a surface 613*a*_1 of the third non-conductive structure 613, which faces the first antenna structure 601, may be spaced from the first antenna structure 601 to form an empty space 613*a* (or a separation space). The second end portion 613_1 of the non-conductive structure 613 may be disposed adjacent to the first antenna structure 601, and the first end portion 613_2 may be fixed to one side (e.g., one end portion 608_1) of the first support member 608.

At least one, for example, four first separating walls 613*b* for separating respective patch antennas disposed at the first antenna structure 601 may be formed at least a portion of the third non-conductive structure 613. The four first separating walls 613*b* may be arranged to divide the empty space 613*a* by a given size. When viewing the third non-conductive structure 613 from a signal radiation surface of the first antenna structure 601, at least a portion of the outer surface 613*b*_1 of the third non-conductive structure 613 may be formed to correspond to a shape of the back plate 680. The third non-conductive structure 613 may be formed to have a uniform curvature along an inner side (e.g., an inner surface of 680*b*) of the back plate 680, and first spaces 613*a* that are formed by the inner surface 613*a*_1 and the separating walls 613*b* may be formed at least a portion of the inner side 613*a*_1 of the third non-conductive structure 613, and the inner surface 613*a*_1 may be formed with a uniform slope as it goes toward the first end portion 613_2 corresponding to an end portion 608_1 of the first support member 608 in the first direction +711 from the second end portion 613_1 of the first antenna structure 601. A portion, which contacts the first support member 608, of the outer surface 613*b*_1 of the third non-conductive structure 613 may be formed to be continuous to the end portion 608_1 of the first support member 608 and may form at least a portion of a first groove 901 such that at least a portion of an end of the back plate 680 is seated. At least a portion of the first space 613*a* (or empty spaces of a specified size) may include a surface that is formed with a uniform slope from an upper end portion of the first antenna structure 601 to one point of the first support member 608.

The electronic device 600 may include the back plate 680 disposed to face one direction +712, the front plate 620 disposed to face an opposite direction-712 facing away from the one direction, the first support member 608 including a side member (e.g., the side member 418 of FIG. 4) interposed between the back plate 680 and the front plate 620, the antenna structure 601 including a surface substantially perpendicular to the one direction +712 and facing in a third direction (e.g., the first direction +711) facing the side member (e.g., the side member 418 of FIG. 4) and including at least one antenna pattern disposed to form a directional beam facing at least in the third direction, a support member integrally formed with the side member (e.g., the side member 418 of FIG. 4) or coupled to the side member, interposed between the front plate 620 and the back plate 680, and including a conductive portion, and the non-conductive structure 613 disposed in a space surrounded by the back plate 680, the support member, the side member, and the surface of the antenna structure 601.

The non-conductive structure 613 may include a body portion including the first end portion 613_2 adjacent to a first region where the back plate 680 meets the side member (e.g., the side member 418 of FIG. 4), the second end portion 613_1 adjacent to a second region where the surface of the antenna structure 601 and an inner surface of the back plate 680 are adjacent to each other, a first surface placed between the first end portion 613_2 and the second end portion 613_1 and formed based on an outline of an inner surface of the back plate 680 and/or an inner surface of the side member, when viewing a cross section cut in the third direction, and a second surface where a distance from the surface of the antenna structure 601 increases as it goes toward the first end portion 613_2 from the second end portion 613_1. The electronic device 600 may further include a wireless communication circuit (e.g., the third RFIC 126 of FIG. 1) electrically connected with at least a portion of the antenna structure 601 and configured to transmit and/or receive a signal having a frequency between 3 GHZ and 100 GHz.

The electronic device 600 may form a beam in the first direction +711 in a state where a signal radiated from the first antenna structure 601 has an influence of the third non-conductive structure 613 and the first support member 608 disposed in a signal radiation direction of the first antenna structure 601. The signal radiated in the first direction +711 may indicate a signal radiation characteristic as illustrated; for example, a first valley 909 may be smoothly formed between the first direction +711 and the second direction +712. A beam pattern (or shape) of the signal radiated from the first antenna structure 601 may be formed in such a way that a main radiation pattern faces a lateral direction (e.g., a direction biased to the first direction +711 between the first direction +711 and the second direction +712).

With regard to forming the third non-conductive structure 613, a method for manufacturing the electronic device 600 may include forming a non-conductive structure, in which the outer surface 613*b*_1 is formed in a curved shape corresponding to an inner side of the edge 680*b* of the back plate 680, the one surface 613*a*_1 is formed to face the first antenna structure 601, and at least a portion thereof is fixed on the first support member 608, through injection molding, and forming the first spaces 613*a* on a surface thereof facing the first antenna structure 601 together with the first separating walls 613*b* by using a tool capable of removing at least a portion of the non-conductive structure, such as a drill. The first separating walls 613*b* may separate the first spaces 613*a* and may be disposed to face a given region (e.g., a region separating patch antennas) or to contact the given region.

Figure 10:
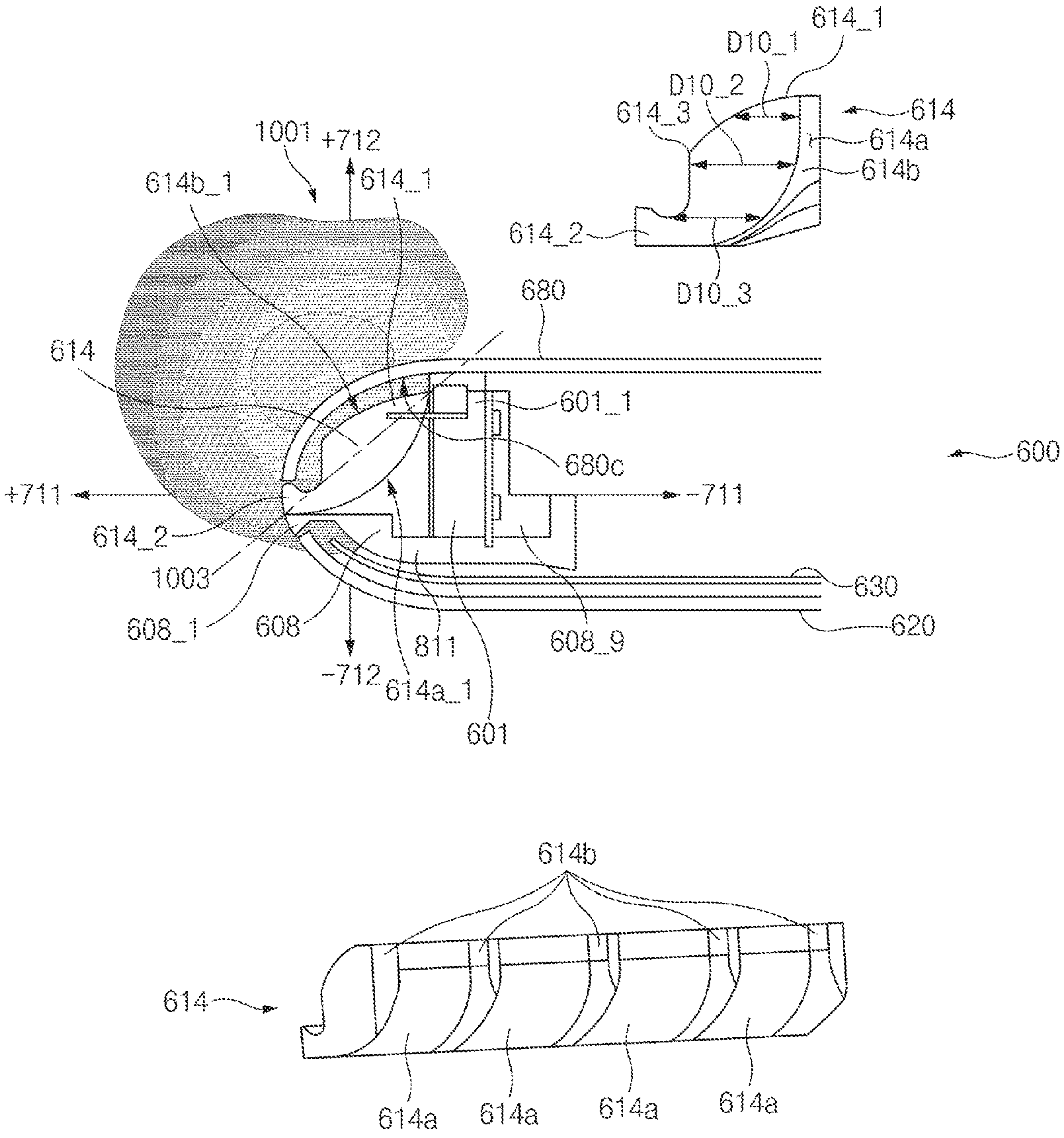
FIG. 10 is a view illustrating another example of a cross section taken along line C-C' of FIG. 5 according to an embodiment of the disclosure.

FIG. 10 is a view illustrating another example of a cross section taken along line C-C' of FIG. 5 according to an embodiment of the disclosure.

Referring to FIG. 10, the electronic device 600 may include the front plate 620, the display 630, the first support member 608, the back plate 680, a fourth non-conductive structure 614, and/or the first antenna structure 601. The front plate 620, the structure 601 may be identical or similar to the components described above with reference to FIG. 9. The antenna support member 608_9 supporting one side of the antenna structure 601 may be disposed on one side of the first support member 608.

At least a portion of a first surface (e.g., an outer surface 614*b*_1) of the fourth non-conductive structure 614, which faces an inner side 680*c* of an edge of the back plate 680, may be formed in a shape similar to that of the inner surface 680*c* of the edge of the back plate 680, for example, in a curved shape. At least a portion of a second surface (e.g., an inner surface 614*a*_1) of the fourth non-conductive structure 614, which faces the first antenna structure 601, may be formed in a curved shape corresponding to the shape of the first surface (e.g., the outer surface 614*b*_1).

In the fourth non-conductive structure 614, with respect to a virtual diagonal line 1003 passing through a second end portion 614_1 facing the upper end 601_1 of the first antenna structure 601 and a first end portion 614_2 contacting one end portion 608_1 of the first support member 608, at least a portion of shapes of the outer side 614*b*_1 and the inner side 614*a*_1 of the fourth non-conductive structure 614 may be formed in various shapes with regard to beamforming of the antenna structure 601 in the first direction +711. For example, at least a portion of the shape of the outer side 614*b*_1 of the fourth non-conductive structure 614 may be formed to be convex toward an edge of the back plate 680, and at least a portion of the shape of the inner side 614*a*_1 of the fourth non-conductive structure 614 may be formed to convex toward the first antenna structure 601 or the first support member 608. The fourth non-conductive structure 614 may include second spaces 614*a* (or empty spaces) facing respective antenna patches disposed at the first antenna structure 601 and may include second separating walls 614*b* separating the second spaces 614*a*. As the fourth non-conductive structure 614 includes a convex curved surface injection molded, the second space 614*a* may be formed to be narrower than the first space 613*a* described above with reference to FIG. 9. The second space 614*a* may include a curved surface 614*a*_1 formed with a uniform curvature from the upper end 601_1 of the first antenna structure 601 to the first end portion 614_2 (e.g., a surface convex toward a point where the first support member 608 or the first antenna structure 601 meets the first support member 608, for example, an inner surface of the fourth non-conductive structure 614).

When viewed from a signal radiation surface of the first antenna structure 601, a thickness D10_1 of the fourth non-conductive structure 614 in a horizontal direction (or the first direction +711), which corresponds to the second end portion 614_1 of the first antenna structure 601, and a thickness D10_2 of the fourth non-conductive structure 614 in the horizontal direction, which corresponds to the middle portion 614_3 of the first antenna structure 601, may be differently formed. For example, as at least a portion of the fourth non-conductive structure 614 is formed to be convex toward the back plate 680 from first point 811 where the first antenna structure 601 meets the first support member 608, a thickness (D10_1 to D10_3) in the horizontal direction from the second end portion 614_1 of the fourth non-conductive structure 614 to the first end portion 614_2 may gradually increase and may then gradually decrease. For another example, the fourth non-conductive structure 614 may have a shape in which a thickness gradually increases from the second end portion 614_1 to a middle point 614_3 (D10_1->D10_2) and gradually decreases from the middle point 614_3 to the first end portion 614_2 (D10_2->D10_3). The increase or decrease in the thickness may be nonlinear.

With regard to a signal characteristic, a beam radiated from an antenna structure may be formed in a hemispherical shape in which the beam is radiated in a state of being biased to the first direction +711 between the first direction +711 and the second direction +712, and a second valley that horizontal polarization radiated in the first direction +711 and vertical polarization radiated in the second direction +712 form may be much smoother than the first valley 909 described with reference to FIG. 9. As such, compared to a signal characteristic of the antenna structure described with reference to FIG. 9, the antenna structure described with reference to FIG. 10 may show a better beam shape as a null region decreases.

Figure 11:
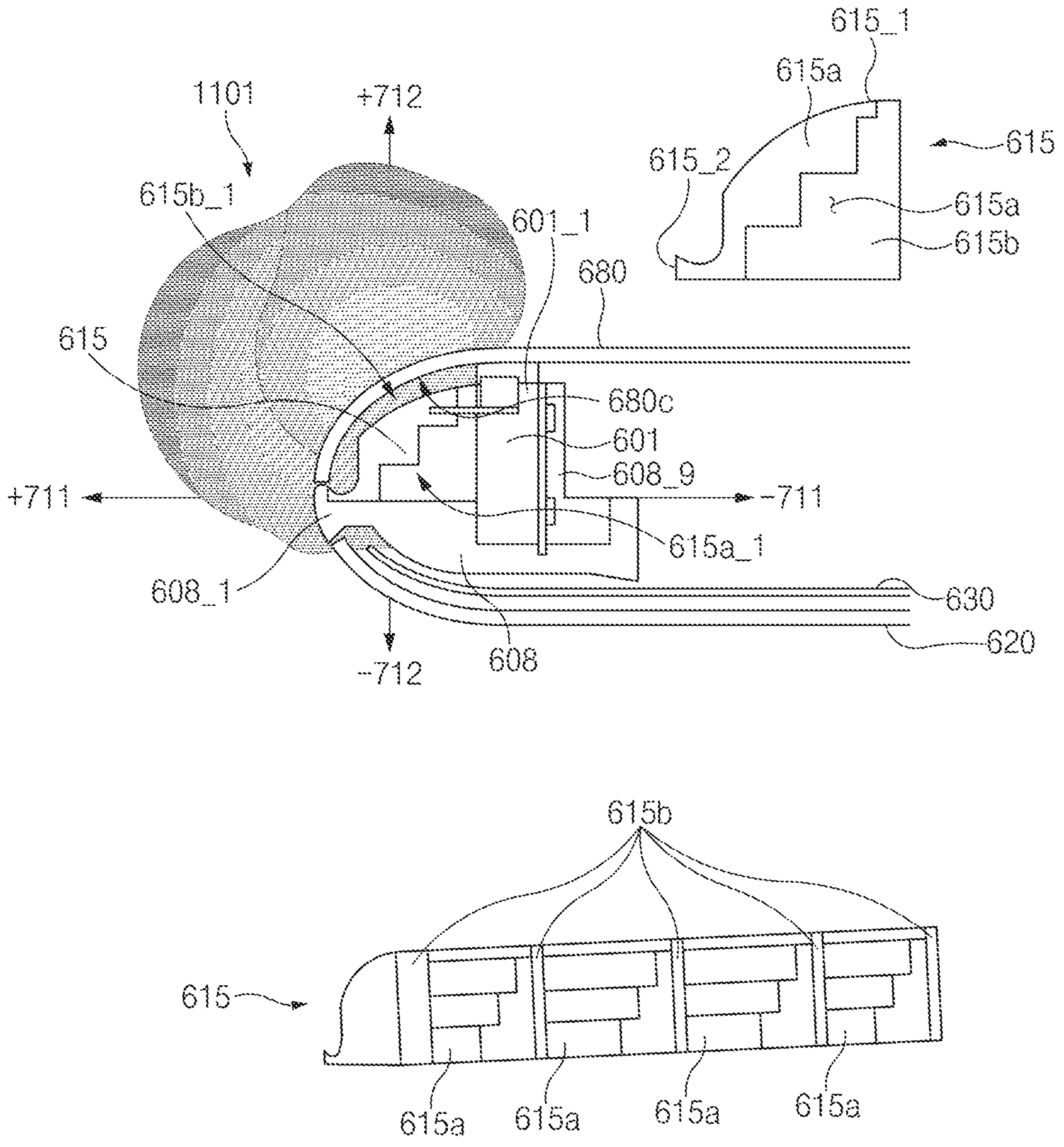
FIG. 11 is a view illustrating another example of a cross section taken along line C-C' of FIG. 5 according to an embodiment of the disclosure.

FIG. 11 is a view illustrating another example of a cross section taken along line C-C' of FIG. 5 according to an embodiment of the disclosure.

Referring to FIG. 11, the electronic device 600 may include the front plate 620, the display 630, the first support member 608, the back plate 680, a fifth non-conductive structure 615, and/or the first antenna structure 601. The front plate 620, the structure 601 may be identical or similar to the components described above with reference to FIG. 9. The antenna support member 608_9 supporting one side of the first antenna structure 601 may be disposed on one side of the first support member 608.

At least a portion of the fifth non-conductive structure 615 may be disposed at the end portion 608_1 of the first support member 608 of the electronic device 600, and the fifth non-conductive structure 615 may be disposed to face at least a portion of the first antenna structure 601. An outer side 615*b*_1 of the fifth non-conductive structure 615 may be disposed to face an inner side 680*c* of the back plate 680 and may be formed in a shape similar to that of the inner side 680*c* of the back plate 680, for example, in a curved shape. An inner side 615*a*_1 of the fifth non-conductive structure 615 may form an empty space 615*a* with the first antenna structure 601 and at least a portion of the first support member 608 and may be formed in a stepped shape. The stepped shape may be formed from a second end portion 615_1 of the fifth non-conductive structure 615 (e.g., a point facing the upper end 601_1 of the first antenna structure 601) to a first end portion 615_2 (e.g., a point contacting the end portion 608_1 of the first support member 608). A third space 615*a* that is formed by the fifth non-conductive structure 615, the first antenna structure 601, and the first support member 608 may include a surface that is formed in a stepped shape from the upper end 601_1 of the first antenna structure 601 to the end portion 608_1 of the first support member 608. The third space 615*a* may be divided into a plurality of spaces by separating walls 615*b*.

A signal radiated from the first antenna structure 601 may progress through the empty space (e.g., air) 615*a* formed within the fifth non-conductive structure 615 and may progress toward the outside of a side surface and a back surface of the back plate 680 through the fifth non-conductive structure 615. A portion (e.g., horizontal polarization) of the signal radiated from the first antenna structure 601 may have an influence of the first support member 608 and may mainly progress in a direction upwardly biased with respect to the first direction +711 (or a direction biased from the first direction +711 to the second direction +712). Also, a portion (e.g., vertical polarization) of the signal radiated from the first antenna structure 601 may progress in the second direction +712. A beam of the signal radiated from the first antenna structure 601 may be formed in the shape of a crushed sphere biased in the first direction +711 and the second direction +712, and a third valley 1101 may be formed between the first direction +711 and the second direction +712.

Figure 12A:
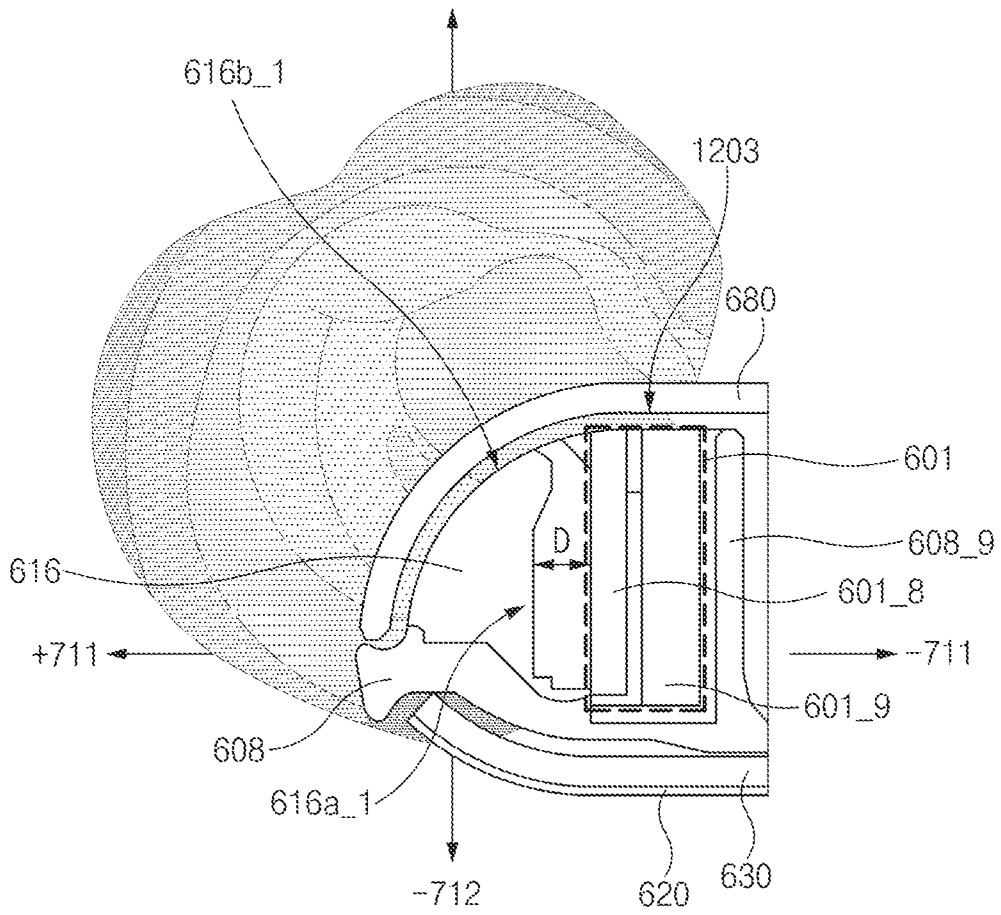
FIG. 12A is a view illustrating one shape of a cross section taken along line C-C' of FIG. 5 according to an embodiment of the disclosure.

FIG. 12A is a view illustrating one shape of a cross section taken along line C-C' of FIG. 5 according to an embodiment of the disclosure.

Referring to FIG. 12A, the electronic device 600 may include the front plate 620, the display 630, the first support member 608, the back plate 680, a non-conductive structure 616, and/or the first antenna structure 601. The front plate 620, the display 630, the first support member 608, the back plate 680, and the first antenna structure 601 may be identical or similar to the components described above with reference to FIG. 9. For example, the first antenna structure 601 may include a PCB 601_8 (e.g., the printed circuit board 210 of FIGS. 2A through 2C) and an RFIC/packaging 601_9 (e.g., the RFIC 252 and the shielding member 290 of FIGS. 2A through 2C). The antenna support member 608_9 supporting one side of the first antenna structure 601 may be disposed at the first support member 608.

In the non-conductive structure 616, a surface **616*b*_1 facing an inner side 1203 of the back plate 680 may be formed in a curved shape, and a surface 616*a*_1 facing the first antenna structure 601 may be formed substantially in parallel with a signal radiation surface of the first antenna structure 601 (e.g., one surface in a direction where a radio wave is mainly radiated, when the antenna array 230 of FIGS. 2A through 2C forms a beam) and may be fixed to the first support member 608. The non-conductive structure 616 may be fixed on the first support member 608 in a state where a distance "D" between the surface 616*a*_1 thereof facing the first antenna structure 601 and the first antenna structure 601 is uniformly maintained. At least one separating wall may be formed at the non-conductive structure 616 at regular intervals such that the patch antennas described with reference to FIGS. 2A through 2C and the non-conductive structure 616 do not contact each other. The at least one separating wall may be aligned between antenna patches such that an antenna patch disposed on the antenna structure 601 does not directly contact the surface 616*a*_1 of the non-conductive structure 616 or such that a distance between the first antenna structure 601 and the non-conductive structure 616 is maintained. In the electronic device 600 having the non-conductive structure 616, when a signal is radiated from at least one antenna pattern 1201 of the first antenna structure 601, because the signal is mainly radiated in the first direction +711 and the second direction +712 as illustrated, it may understood that a signal radiation gain in the first direction +711 is low compared with a fifth radiator of FIG. 11**.

Figure 12B:
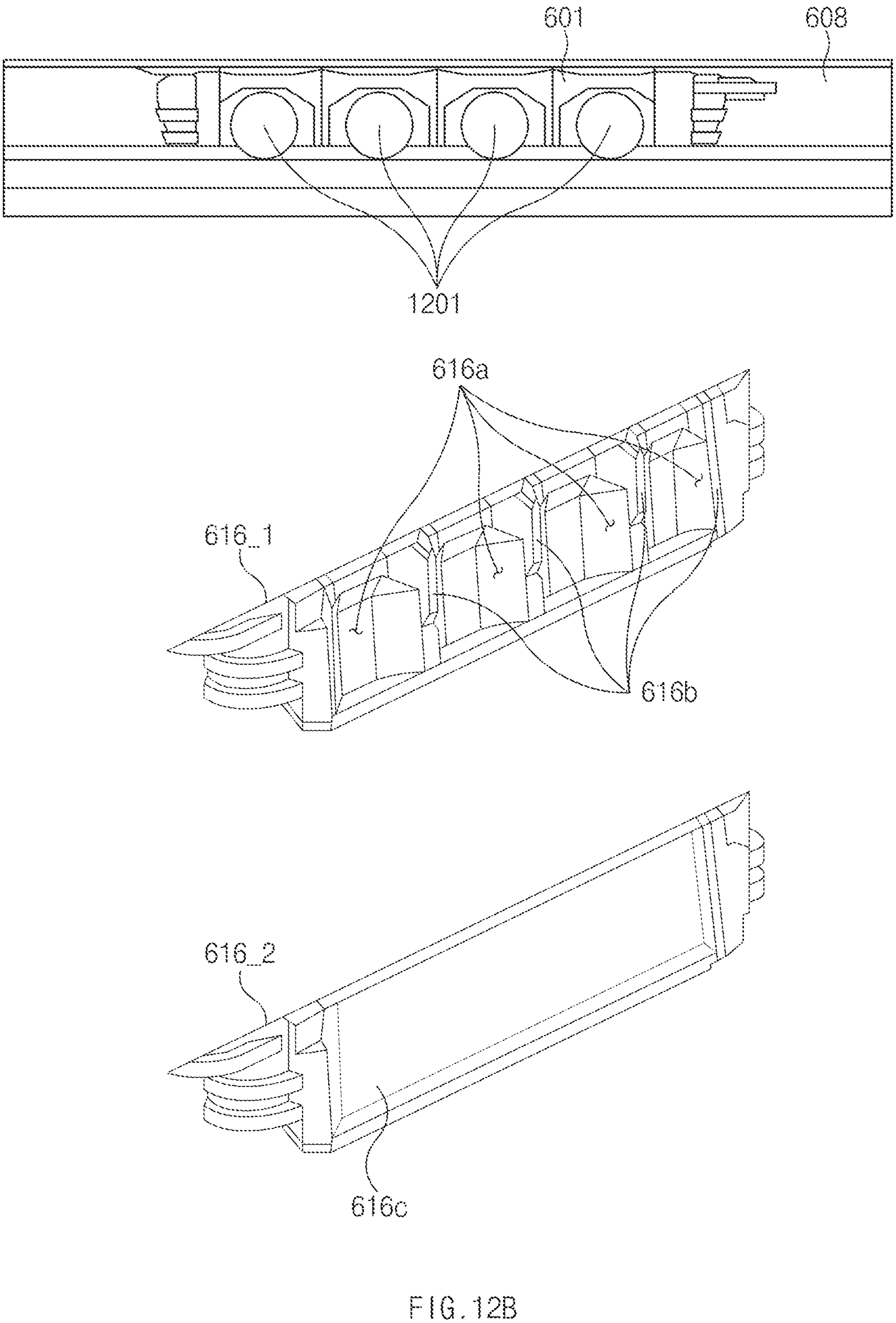
FIG. 12B is a view illustrating a non-conductive structure and a region where a non-conductive structure is disposed according to an embodiment of the disclosure.

FIG. 12B is a view illustrating a non-conductive structure and a region where a non-conductive structure is disposed according to an embodiment of the disclosure.

Referring to FIGS. 12A and 12B, the first antenna structure 601 may be disposed at the first support member 608. The first antenna structure 601 may include at least one antenna pattern 1201 (e.g., the plurality of antenna elements 232, 234, 236, and 238 of FIGS. 2A through 2C). A non-conductive structure 616_1 may include at least one separating wall **616*b* as illustrated. The non-conductive structure 616_1 may include the spaces 616*a* that are separated from each other by the separating wall 616*b*. Each of the spaces 616*a* may be disposed to correspond to the antenna pattern 1201 one-to-one and may be disposed to maintain a given distance (e.g., the distance "D" of FIG. 12A) between the antenna pattern 1201 and one inner surface 616*a*_1 of the non-conductive structure 616_1. The one inner surface 616*a*_1 of the non-conductive structure 616_1 forming the space 616*a* may be formed in a direction (e.g., one direction −712) that is parallel to one surface of the first antenna structure 601. As such, a distance (e.g., the distance "D" of FIG. 12A) between at least a portion of the one inner surface 616*a*_1 of the non-conductive structure 616_1 and the first antenna structure 601** may be uniformly maintained.

The electronic device 600 may include a non-conductive structure 616_2 that does not include the separating walls 616. As the separating walls 616 are removed, the non-conductive structure 616_2 may include an empty space **616*c* of a given size therein. The empty space 616*c* may be a space in which spaces (e.g., the empty spaces 616*a*) separated from each other by the separating walls 616*b* of the non-conductive structure 616_1 are combined. The one inner surface 616*a*_1 of the non-conductive structure 616_2 may be uniformly formed in the one direction-712, and each distance between the antenna structure 601 and each of an upper portion, a middle portion, and a lower portion of the one inner surface 616*a*_1 of the non-conductive structure 616_2** may be identically formed.

The electronic device 600 may include a support member (e.g., the first support member 608) supporting the antenna structure 601, and the support member may include a conductive portion and another conductive portion. An opening may be formed between the conductive portion and the other conductive portion, and at least a portion of the non-conductive structure (e.g., at least one of the non-conductive structures 616_1 and 616_2) may be disposed to fill the opening. In this case, the non-conductive structure 609 may contact the conductive portion and the other conductive portion. For example, one side portion of the support member 608 may be removed to form an opening, and the non-conductive member (at least one of 616_1 and 616_2) may be seated in the opening, which is formed by removing the one side portion of the support member 608, and may be disposed between the conductive portion and the other conductive portion of the support member 608. In this case, the non-conductive member (at least one of 616_1 and 616_2) may be disposed to contact one side of each of edges of the conductive portions forming the opening.

Figure 13:
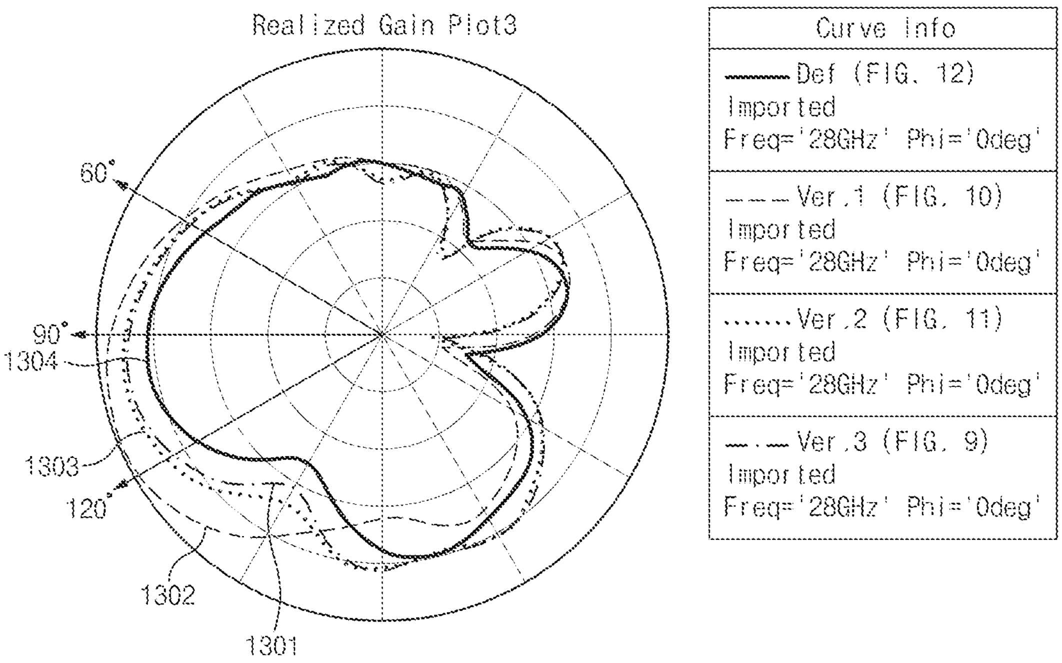
FIG. 13 is a view illustrating a 2D simulation result of signal radiation of non-conductive structures described with reference to FIGS. 3 to 12B according to an embodiment of the disclosure.

FIG. 13 is a view illustrating a 2D simulation result of signal radiation of non-conductive structures described with reference to FIGS. 9 to 12B according to an embodiment of the disclosure.

Referring to FIG. 13, a closed curve 1301 (Ver.3) is a chart indicating a signal gain characteristic of the first antenna structure 601 in an antenna structure having the third non-conductive structure 613 described with reference to FIG. 9, a closed curve 1302 (Ver.1) is a chart indicating a signal gain characteristic of the first antenna structure 601 in an antenna structure having the fourth non-conductive structure 614 described with reference to FIG. 10, a closed curve 1303 (Ver.2) is a chart indicating a signal gain characteristic of the first antenna structure 601 in an antenna structure having the fifth non-conductive structure 615 described with reference to FIG. 11, and a closed curve 1304 (Def) is a chart indicating a signal gain characteristic of the first antenna structure 601 in an antenna structure having the non-conductive structure 616 described with reference to FIGS. 12A and 12B. In a table, "Module" indicates a signal gain value when a separate non-conductive structure does not exist. 60 degrees, 90 degrees, and 120 degrees may indicate gain values of side radiation patterns of vertical polarization in respective directions.

It may be understood from the result that a radiation gain of a lateral direction (e.g., −90 degrees) is decreased by the non-conductive structure 616 as much as 4.9 dB compared with module performance in air. As the injection-molding structures of the inventive concept, non-conductive structures having a signal characteristic of the first closed curve 1301 corresponding to FIG. 9 (asymmetric cut to bottom), a signal characteristic of the second closed curve 1302 corresponding to FIG. 10 (R-cut), and a signal characteristic of the third closed curve 1303 corresponding to FIG. 11 (step-cut) show improvement of a maximum of 3.2 dB and a minimum of 1.5 dB.

Figure 14A:
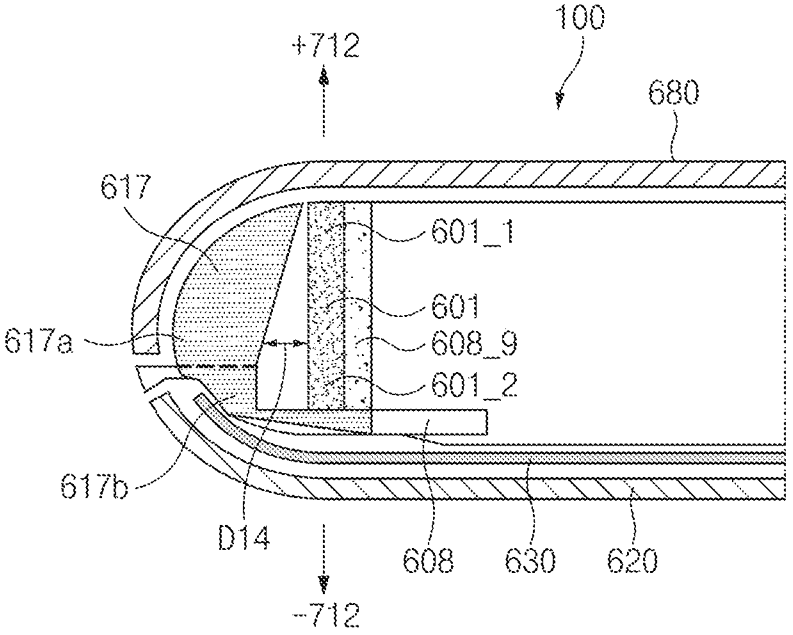
FIG. 14A is a view illustrating one shape of a partial configuration of an electronic device including a non-conductive structure according to an embodiment of the disclosure.

FIG. 14A is a view illustrating one shape of a partial configuration of an electronic device including a non-conductive structure according to an embodiment of the disclosure.

Referring to FIG. 14A, an electronic device 100 may include the first plate 620, of which at least a portion is disposed to face the one direction-712, the second plate 680, of which at least a portion is disposed to face the opposite direction +712 facing away from the one direction-712, the first support member 608 interposed between the first plate 620 and the second plate 680, the first antenna structure 601, and/or a sixth non-conductive structure 617 disposed on one side of the first support member 608. The display 630 may be interposed between the first plate 620 and a housing (e.g., housing 410 of FIG. 4). The antenna support member 608_9 supporting one side of the first antenna structure 601 may be disposed at the first support member 608.

The sixth non-conductive structure 617 may include, for example, a first structure 617*a* facing the antenna structure 601, and a second structure 617*b* integrally formed with the first structure 617*a* and supporting the first structure 617*a*. In an embodiment, the first structure 617*a* and the second structure 617*b* may be formed of the same material (e.g., a PC material). For example, the first structure 617*a* and the second structure 617*b* may be integrally formed of the same material (e.g., a PC material) only in a region facing the antenna structure 601 or a region, in which patch antennas of the antenna structure 601 are disposed, and peripheral portions thereof may be formed of a material of the first support member 608. The first structure 617*a* may be formed to be identical or similar in shape to the non-conductive structure 613 described above with reference to FIG. 9. For example, the first structure 617*a* may be disposed in a shape where a facing distance D4 varies as the closer to a point 601_2 (e.g., corresponding to a middle point or below) of the antenna structure 601 from the upper end 601_1 of the antenna structure 601.

The second structure 617*b* may be formed to be identical or similar in shape to one side of an edge of the first support member 608 (or a support member) described with reference to FIG. 9, and a material of the second structure 617*b* may be different from a material of the first support member 608 (or a support member).

Figure 14B:
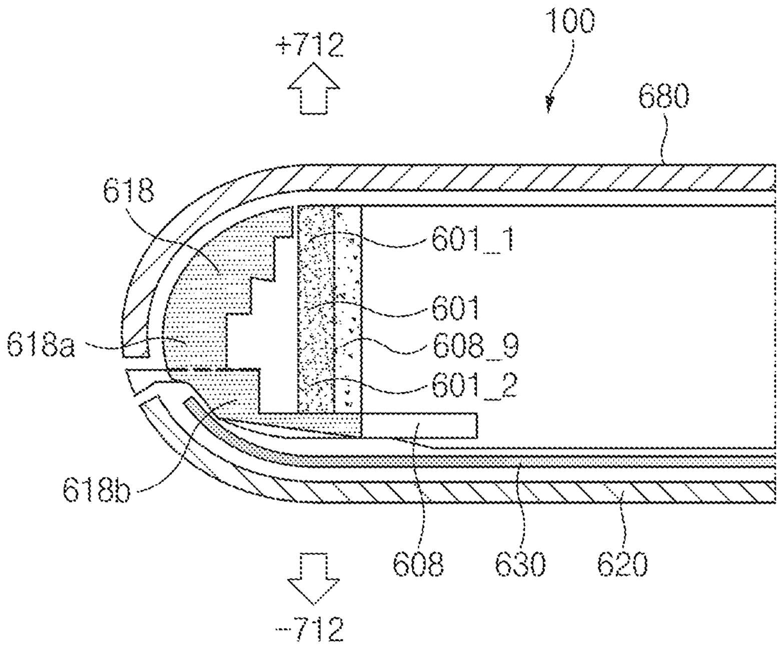
FIG. 14B is a view illustrating another shape of a partial configuration of an electronic device including a non-conductive structure according to an embodiment of the disclosure.

FIG. 14B is a view illustrating another shape of a partial configuration of an electronic device including a non-conductive structure according to an embodiment of the disclosure.

Referring to FIG. 14B, the electronic device 100 may include the first plate 620, of which at least a portion is disposed to face the one direction-712, the second plate 680, of which at least a portion is disposed to face the opposite direction +712 facing away from the one direction-712, the first support member 608 interposed between the first plate 620 and the second plate 680, the first antenna structure 601, and/or a seventh non-conductive structure 618 disposed on one side of the first support member 608. The electronic device 100 may further include the display 630 interposed between the first plate 620 and the first support member 608. The antenna support member 608_9 supporting one side of the first antenna structure 601 may be disposed at the first support member 608.

The seventh non-conductive structure 618 may include, for example, a third structure 618*a* facing the antenna structure 601, and a fourth structure 618*b* integrally formed with the third structure 618*a* and supporting the third structure 618*a*. The third structure 618*a* and the fourth structure 618*b* may be formed of the same material (e.g., a PC material). The third structure 618*a* and the fourth structure 618*b* may be integrally formed of the same material (e.g., a PC material) only in a region facing the antenna structure 601 or a region in which patch antennas of the antenna structure 601 are disposed, and peripheral portions thereof may be formed of a material of the first support member 608. The third structure 618*a* may be formed to be identical or similar in shape to the non-conductive structure 615 described above with reference to FIG. 11. For example, the third structure 618*a* may have a stepped shape from the upper end 601_1 of the antenna structure 601 to the point 601_2 (e.g., corresponding to a middle point or below) of the antenna structure 601.

The fourth structure 618*b* may be formed to be identical or similar in shape to one side of an edge of the first support member 608 (or a support member) described with reference to FIG. 11, and a material of the fourth structure 618*b* may be different from a material of the first support member 608 (or a support member).

Figure 15:
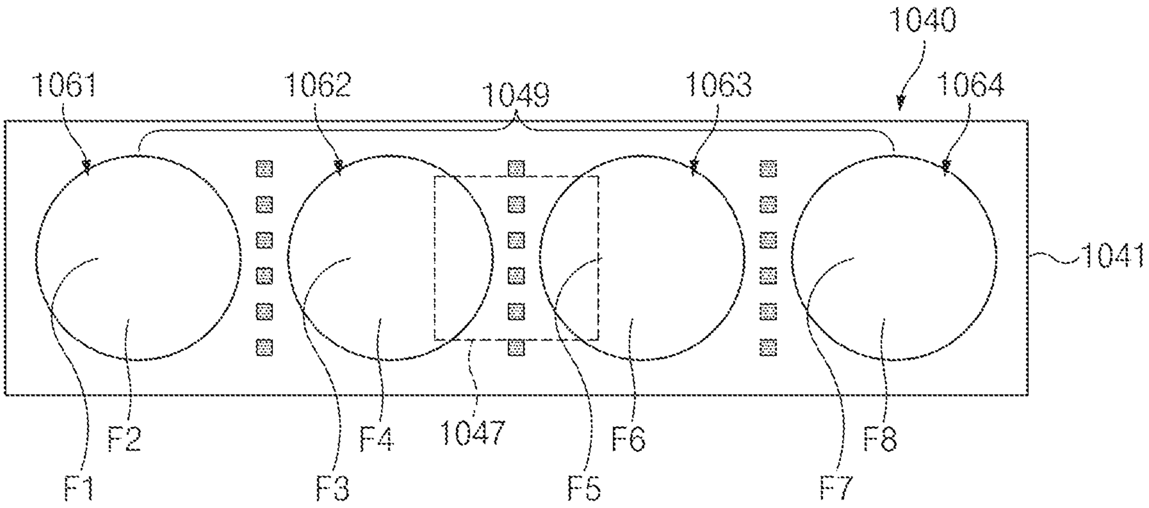
FIG. 15 is a view illustrating one shape of an antenna module according to an embodiment of the disclosure.

FIG. 15 is a view illustrating one shape of an antenna module according to an embodiment of the disclosure.

Referring to FIG. 15, an antenna module illustrated in FIG. 15 may be an antenna module including an antenna structure applied to FIGS. 9 to 12B or FIGS. 14A and 14B above.

Referring to FIG. 15, an antenna module 1040 may include a printed circuit board 1041, antenna elements 1049 (e.g., patch antennas 1061, 1062, 1063, and 1064) mounted on the printed circuit board 1041, or an RFIC 1047. The printed circuit board 1041 may include feeding parts F2, F4, F6, and F8 for vertical polarization or feeding parts F1, F3, F5, and F7 for horizontal polarization.

Figure 16:
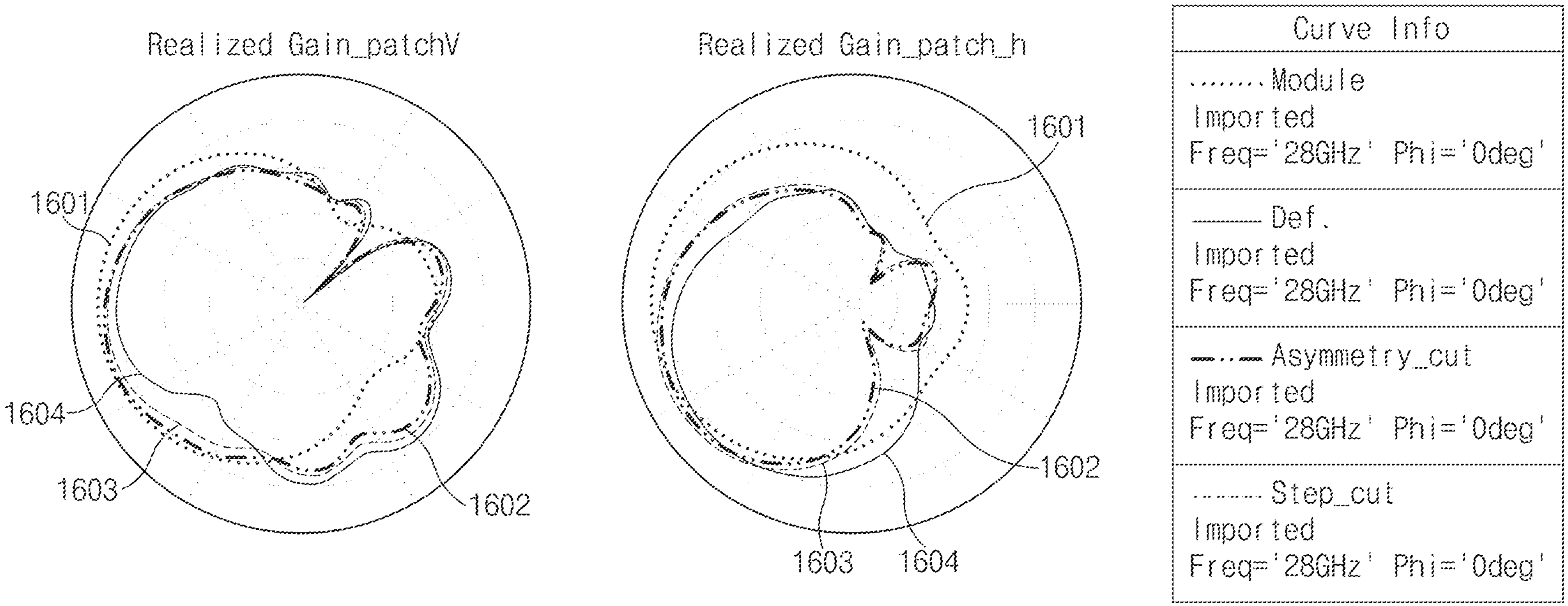
FIG. 16 is a view illustrating a polarization characteristic according to a non-conductive structure shape and a surrounding environment according to an embodiment of the disclosure.

FIG. 16 is a view illustrating a polarization characteristic according to an antenna module described with reference to FIG. 15, non-conductive structures of FIGS. 9 and 11, and a surrounding environment according to an embodiment of the disclosure.

Referring to FIG. 16, Module 1601 may indicate a vertical/horizontal polarization characteristic that is measured in a state where a separate non-conductive structure or the back plate 680 is removed, and Def 1604 may indicate a vertical/horizontal polarization characteristic that is measured in a state where the non-conductive structure 616 described with reference to FIGS. 12A and 12B is disposed. Asymmetry_cut 1602 may indicate a vertical/horizontal polarization characteristic that is measured in a state where the non-conductive structure 613 described with reference to FIG. 9 is disposed, and Step_cut 1603 may indicate a vertical/horizontal polarization characteristic that is measured in a state where the non-conductive structure 615 described with reference to FIG. 11 is disposed. It may be understood from FIG. 16 that polarization characteristics corresponding to FIGS. 9 and 11 are within an allowable range.

According to various embodiments of the disclosure, an electronic device (e.g., 600 of FIG. 6) may include a housing (e.g., the housing 410 of FIG. 4) that includes a first plate (e.g., the front plate 620) including at least a portion of an outer surface facing one direction (e.g., +712), a second plate (e.g., the back plate 680 of FIG. 9) including at least a portion of an outer surface facing an opposite direction (e.g., −712) facing away from the one direction, and a side member (e.g., a side bezel structure or the side member 418 of FIG. 4) surrounding a space between the first plate and the second plate and coupled to the second plate or integrally formed with the second plate, a support member (e.g., the first support member 608 of FIG. 9) that is integrally formed with the side member or is coupled to the side member, is interposed between the first plate and the second plate, and includes a conductive portion, an antenna structure (e.g., the antenna structure 601 of FIG. 9) that is interposed between the second plate and the support member and includes at least one antenna pattern (e.g., the antenna element 232 of FIGS. 2A through 2C or the antenna pattern 1201 of FIGS. 12A and 12B) including at least a portion of a surface facing one specific direction (e.g., +711), which is substantially perpendicular to the one direction and faces the side member, and disposed to form a directional beam facing at least in the one specific direction, a non-conductive structure (e.g., the non-conductive structure 613 of FIG. 9) that is disposed in a space surrounded by the second plate, the support member, the side member, and the surface of the antenna structure and includes a body portion including the first end portion 613_2 adjacent to a first region where the support member meets the side member, the second end portion 613_1 adjacent to a second region where the surface of the antenna structure and an inner surface of the second plate are adjacent to each other, a first surface (e.g., 613*b*_1) interposed between the first end portion and the second end portion and formed based on an outline of an inner surface (e.g., surface 903) of the second plate and/or an inner surface of the side member, and a second surface (e.g., 613*a*_1) where a distance from the surface of the antenna structure increases as it goes toward the first end portion from the second end portion, and a wireless communication circuit (e.g., the third RFIC 126 of FIG. 1) that is electrically connected with the antenna pattern and transmits and/or receives a signal having between 3 GHZ and 100 GHz.

The first surface may form a first convex cross section.

The second surface may form a second convex cross section.

The third surface may form a stepped cross section.

The second surface may form a linear cross section.

According to various embodiments of the disclosure, an electronic device may include a support member (e.g., the support member 608 of FIG. 10), a front plate (e.g., 620) disposed on a front surface of the support member, a back plate (e.g., 680) disposed on a back surface of the support member, a non-conductive structure (e.g., 614) interposed between the back plate and an edge of the support member and fixed to the support member, and an antenna structure interposed between the back plate and the support member, at least a portion of the antenna structure (e.g., 601) may be disposed to face the non-conductive structure, and in a region of the non-conductive structure, which faces the antenna structure, a separated distance from the antenna structure may vary depending on a distance from a bottom surface of the support member to which the non-conductive structure is fixed.

The back plate may include a shape where at least a portion thereof is curved with a given curvature at an edge of the support member.

The non-conductive structure may include a surface of a shape where at least a portion of a surface thereof facing the back plate is convex with a uniform curvature.

The non-conductive structure may include a surface having a uniform slope from a point facing an upper end of the antenna structure to a point fixed to the support member.

The non-conductive structure may include a curved surface having a uniform curvature from a point facing an upper end of the antenna structure to a point fixed to the support member.

In the curved surface of the non-conductive structure, at least a portion of an inner side that faces away from an outer surface disposed adjacent to the back plate may include a surface that is convex toward a point where the antenna structure meets the support member.

At least a portion of the curved surface of the non-conductive structure may include a surface that is convex in a direction, in which the back plate is disposed, at a point where the antenna structure meets the support member.

At least a portion of the non-conductive structure may include a surface that is formed in the shape of a plurality of steps from a point facing an upper end of the antenna structure to a point fixed to the support member.

The antenna structure may include a plurality of patch antennas that are fixed to one side of the support member, are disposed to radiate a signal toward the outside of a side surface of the support member, and are disposed to be spaced from each other as much a given distance.

The non-conductive structure may include at least one separating wall dividing at least a part of empty spaces.

The separating wall may be disposed to correspond to a separation distance of the patch antennas.

At least a portion of the separating wall may be disposed to contact the antenna structure.

The plurality of antenna patches disposed at the antenna structure may be disposed to be spaced from the non-conductive structure as much as a specified distance or more.

At least a portion of the support member may be formed of a metal material.

The back plate may be formed of a different material from the non-conductive structure.

Figure 17:
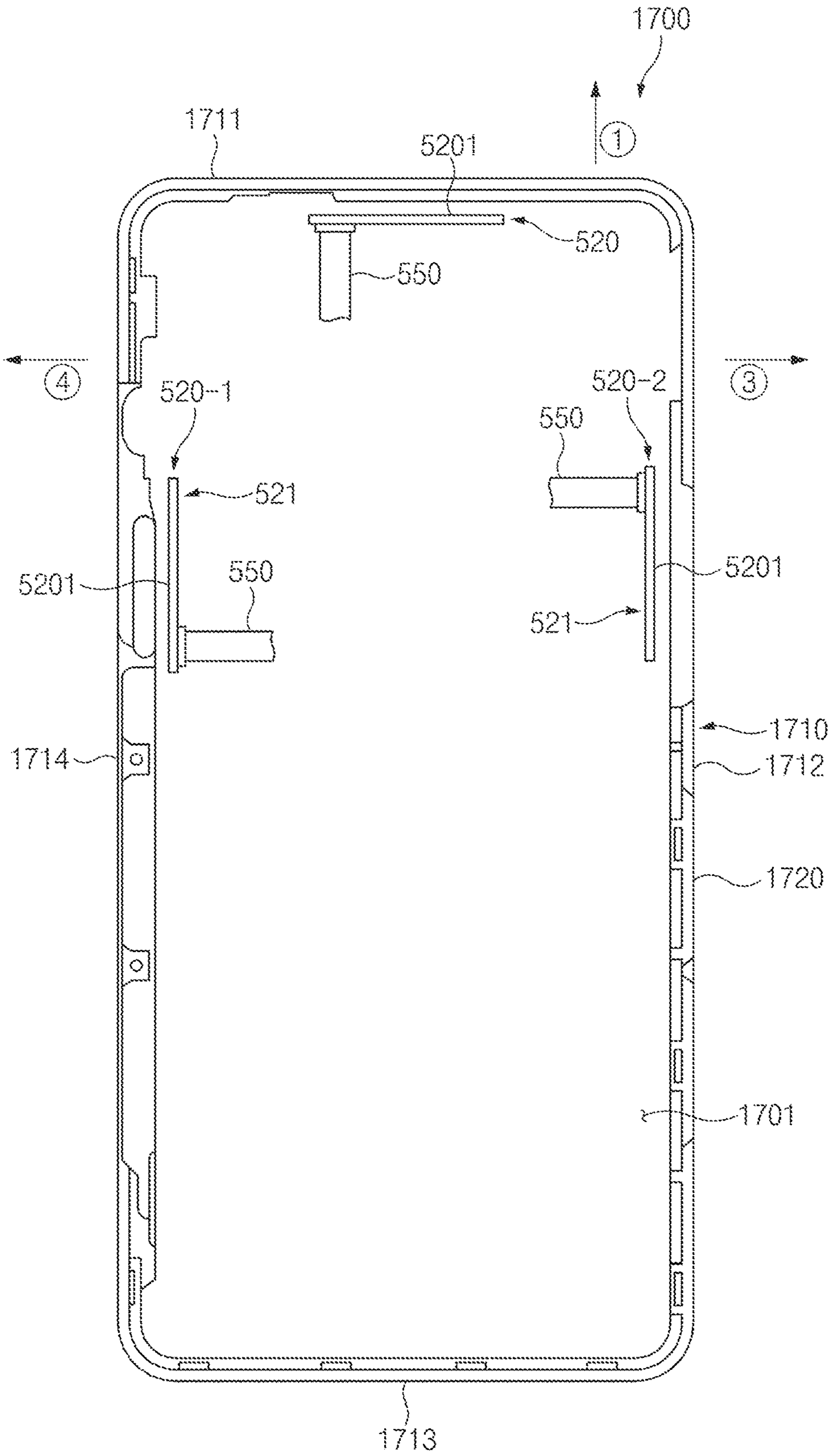
FIG. 17 is a view illustrating one example of a vertical mounting structure of an antenna module according to an embodiment of the disclosure.

FIG. 17 is a view illustrating one example of a vertical mounting structure of an antenna module according to an embodiment of the disclosure.

Referring to FIG. 17, a first antenna module 520, a second antenna module 520-1, or a third antenna module 520-2 may be disposed in a partial region of a corner of an electronic device 1700. The first antenna module 520 may be disposed in such a way that that one surface of a substrate 521 of the first antenna module 520 faces one side of a first portion 1711 of a housing 1710. When viewed from above a second plate (e.g., the second plate 680 of FIG. 6) of the electronic device 1700, the first antenna module 520 may be disposed in such a way that a first side portion 5201 of the substrate 521 of the antenna module 520 is in parallel with the first portion 1711 of the housing 1710. The second antenna module 520-1 may be disposed in such a way that one surface of the substrate 521 of the second antenna module 520-1 is disposed to be adjacent and parallel to a fourth portion 1714 of the housing 1710 in a partial region of the fourth portion 1714. The third antenna module 520-2 may be disposed in such a way that one surface of the substrate 521 of the third antenna module 520-2 is disposed to be adjacent and parallel to a second portion 1712 of the housing 1710 in a partial region of the second portion 1712.

According to various embodiments of the disclosure, the first antenna module 520 may form a beam pattern facing the first portion 1711 of the housing 1710 (e.g., to face in direction (1)). The second antenna module 520-1 may form a beam pattern facing the fourth portion 1714 of the housing 1710 (e.g., to face in direction 4)). The third antenna module 520-2 may form a beam pattern facing the second portion 1712 of the housing 1710 (e.g., to face in direction 33).

As described above, a portable communication device according to an embodiment of the disclosure may include a housing that includes a plate forming at least a portion of a back surface of the portable communication device, and a conductive portion forming at least a portion of a side surface of the portable communication device, a display that is accommodated in the housing and is viewable through a front surface of the portable communication device, an antenna structure that is accommodated in the housing, wherein the antenna structure includes a printed circuit board, and one or more antennas formed at the printed circuit board to face the side surface, and wherein at least a portion of the antenna structure is placed to be viewable in a state of overlapping the conductive portion, when viewed in a direction substantially perpendicular to a surface facing the side surface of the printed circuit board, and a non-conductive member that is placed between the display, the plate, and the antenna structure (alternatively, at least a portion of a side surface of the housing being provided as the conductive portion and the non-conductive member being placed between the side surface of the housing and the antenna structure), and at least a partial region of a surface of the non-conductive member, which faces the antenna structure, may be convex, and a progress path of a radio frequency signal radiated from the one or more antennas may be changed when passing through the at least a partial region.

The progress path may be changed to face the side surface when passing through the at least a partial region.

The portable communication device may further include a support member supporting the antenna structure, and the conductive portion may be extended from the support member.

The portable communication device may further include a support member supporting the antenna structure, the support member may be interposed between the display and the plate, and the non-conductive member may be placed in a space formed by the plate, the support member, and the antenna structure.

The portable communication device may further include a support member supporting the antenna structure, the support member may include another conductive portion, an opening may be formed between the conductive portion and the other conductive portion, and at least a portion of the non-conductive member may be filled in the opening.

The non-conductive member may contact the conductive portion and the other conductive portion.

The surface of the non-conductive member may include another region being convex and a separating wall placed between the at least a partial region and the other region.

The one or more antennas may include a first antenna formed at a first portion of the printed circuit board and a second antenna formed at a second portion of the printed circuit board, and, when viewed in a direction substantially perpendicular to the surface of the printed circuit board, the first antenna may overlap the at least a partial region, the second antenna overlaps the other region, and the separating wall may overlap a third portion placed between the first portion and the second portion.

A portable communication device according to an embodiment of the disclosure may include a housing that includes a plate forming at least a portion of a back surface of the portable communication device, and a conductive portion forming at least a portion of a side surface of the portable communication device, a display that is accommodated in the housing and is viewable through a front surface of the portable communication device, an antenna structure that is accommodated in the housing, wherein the antenna structure includes a printed circuit board, and one or more antennas formed at the printed circuit board to face the side surface, a support member that supports the antenna structure, wherein the support member is extended from the conductive portion, and a non-conductive member that is placed between the display, the plate, and the antenna structure, at least a partial region of a surface of the non-conductive member, which faces the antenna structure, may be convex, and a progress path of a radio frequency signal radiated from the one or more antennas may be changed when passing through the at least a partial region.

The non-conductive member may be interposed between the display and the plate and may be interposed between the antenna structure and a side portion of the housing forming the plate. Alternatively, the non-conductive member may be interposed between the display and the plate and may be disposed adjacent to the antenna structure. In this case, at least a portion of the non-conductive member may be interposed between the antenna structure and the first conductive portion. Alternatively, at least a portion of the non-conductive member may be disposed in an opening that is formed by removing a portion of a side surface of the housing.

The progress path may be changed to face the side surface when passing through the at least a partial region.

At least a portion of the antenna structure may be placed to be viewable in a state of overlapping the conductive portion, when viewed in a direction substantially perpendicular to a surface facing the side surface of the printed circuit board.

The surface of the non-conductive member may include another region being convex and a separating wall placed between the at least a partial region and the other region.

The one or more antennas may include a first antenna formed at a first portion of the printed circuit board and a second antenna formed at a second portion of the printed circuit board, and, when viewed in a direction substantially perpendicular to the surface of the printed circuit board, the first antenna may overlap the at least a partial region, the second antenna overlaps the other region, and the separating wall may overlap a third portion placed between the first portion and the second portion.

A portable communication device according to an embodiment of the disclosure may include a housing that includes a plate forming at least a portion of a back surface of the portable communication device, and a conductive portion forming at least a portion of a side surface of the portable communication device, a display that is accommodated in the housing and is viewable through a front surface of the portable communication device, an antenna structure that is accommodated in the housing, wherein the antenna structure includes a printed circuit board, and one or more antennas formed at the printed circuit board to face the side surface, and wherein at least a portion of the antenna structure is placed to be viewable in a state of overlapping the conductive portion, when viewed in a direction substantially perpendicular to a surface facing the side surface of the printed circuit board, and a non-conductive member that is placed between the display, the plate, and the antenna structure, at least a partial region of a surface of the non-conductive member, which faces the antenna structure, may be convex, planar, or stepped, and a progress path of a radio frequency signal radiated from the one or more antennas may be changed when passing through the at least a partial region.

The progress path may be changed to face the side surface when passing through the at least a partial region.

The portable communication device may further include a support member supporting the antenna structure, and wherein the conductive portion may be extended from the support member.

The portable communication device may further include a support member supporting the antenna structure, the support member may include another conductive portion, an opening may be formed between the conductive portion and the other conductive portion, and at least a portion of the non-conductive member may be filled in the opening.

A portable communication device according to an embodiment of the disclosure may include a housing that includes a plate forming at least a portion of a back surface of the portable communication device, and a conductive portion forming at least a portion of a side surface of the portable communication device, a display that is accommodated in the housing and is viewable through a front surface of the portable communication device, an antenna structure that is accommodated in the housing, wherein the antenna structure includes a printed circuit board, a first antenna formed at a first portion of the printed circuit board to face the side surface, and a second antenna formed at a second portion of the printed circuit board, and a non-conductive member that is placed between the display, the plate, and the antenna structure, and a surface of the non-conductive member, which faces the antenna structure, may include a first region placed to be viewable in a state of overlapping the first antenna, when viewed in a direction substantially perpendicular to a surface facing the side surface of the printed circuit board, a second region placed to be viewable in a state of overlapping the second antenna, and a separating wall placed between the first region and the second region.

Each of the first region and the second region may be convex, planar, or stepped.

The portable communication device may further include a support member supporting the antenna structure, the support member may include another conductive portion, and the non-conductive member may be placed to contact the conductive member and the other conductive portion.

The non-conductive member of the portable communication device may be composed of a non-conductive material.

A partial region facing the antenna structure may form an asymmetrical surface with respect to a portion of a surface of the antenna structure.

The surface of the non-conductive member facing the antenna structure may be spaced apart from the antenna structure so as to form an empty space.

The non-conductive member of the portable communication device may include at least one separating wall dividing the empty space into a plurality of empty spaces.

As a shape of a non-conductive structure facing an antenna is formed to optimize a signal radiation characteristic of the antenna, a good signal characteristic may be maintained.

In addition, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:

a housing including a conductive portion forming at least part of a side surface of the portable communication device and having an opening formed therein;

a display accommodated in the housing as viewable through a front surface of the portable communication device;

an antenna structure accommodated in the housing such that a first antenna radiator and a second antenna radiator formed in the antenna structure face the opening; and a non-conductive member accommodated in the housing between the side surface of the portable communication device and the antenna structure, a first surface of the non-conductive member facing the side surface of the portable communication device and at least partially filling the opening, and a second surface of the non-conductive member facing the antenna structure and having a shape such that a first distance between the second surface of the non-conductive member and a middle portion of the antenna structure is different from a second distance between the second surface of the non-conductive member and at least one of an upper or lower end portion of the antenna structure.

2. The portable communication device of claim 1, wherein the first distance is longer than the second distance.

3. The portable communication device of claim 1, wherein the first distance is substantially same over an entire area of the middle portion of the antenna structure.

4. The portable communication device of claim 2, wherein at least part of the middle portion of the antenna structure is overlapped with the opening when viewed from the side surface of the portable communication device.

5. The portable communication device of claim 1, wherein the second surface of the non-conductive member includes a first region, a second region and a wall portion protruded between the first region and the second region, and wherein the non-conductive member is disposed adjacent to the antenna structure such that the first antenna radiator and the second antenna radiator face the first region and the second region, respectively.

6. The portable communication device of claim 1, wherein the shape of the second surface of the non-conductive member facing the antenna structure is substantially concave.

7. The portable communication device of claim 1, wherein a length of the non-conductive member is longer than a length of the antenna structure.

8. The portable communication device of claim 1, further comprising a gap between the second surface of the non-conductive member and the antenna structure.

9. The portable communication device of claim 1, wherein the non-conductive member is formed through injection molding.

10. A portable communication device comprising:

a housing including a conductive portion forming at least part of a side surface of the portable communication device and having an opening formed therein;

a display accommodated in the housing as viewable through a front surface of the portable communication device;

an antenna structure accommodated in the housing such that a first antenna radiator formed in the antenna structure faces the opening; and a non-conductive member accommodated in the housing between the side surface of the portable communication device and the antenna structure, a first surface of the non-conductive member facing the side surface of the portable communication device and at least partially filling the opening, and a second surface of the non-conductive member facing the antenna structure and having a shape such that a first distance between the second surface of the non-conductive member and a middle portion of the antenna structure is different from a second distance between the second surface of the non-conductive member and at least one of an upper or lower end portion of the antenna structure.

11. The portable communication device of claim 10, wherein the first distance is longer than the second distance.

12. The portable communication device of claim 10, wherein the first distance is substantially same over an entire area of the middle portion of the antenna structure.

13. The portable communication device of claim 10, wherein at least part of the middle portion of the antenna structure is overlapped with the opening when viewed from the side surface of the portable communication device.

14. The portable communication device of claim 10, wherein the shape of the second surface of the non-conductive member facing the antenna structure is substantially concave.

15. The portable communication device of claim 10, wherein a length of the non-conductive member is longer than a length of the antenna structure.

16. The portable communication device of claim 10, further comprising a gap between the second surface of the non-conductive member and the antenna structure.

17. The portable communication device of claim 10, wherein the non-conductive member is formed through injection molding.

* * * * *